United States Patent
Drader et al.

(10) Patent No.: US 11,273,475 B2
(45) Date of Patent: Mar. 15, 2022

(54) HIGH RATE HYDROCARBON SOLVENT EXTRACTION SYSTEM, PROCESS AND METHOD

(71) Applicant: Clean Planet Technology Inc., Calgary (CA)

(72) Inventors: Daniel Drader, Calgary (CA); Brian Gibbs, Cochrane (CA)

(73) Assignee: Clean Planet Technology Inc., Calgary (CA)

(*) Notice: Subject to any disclaimer, the term of this patent is extended or adjusted under 35 U.S.C. 154(b) by 22 days.

(21) Appl. No.: 16/788,767

(22) Filed: Feb. 12, 2020

(65) Prior Publication Data

US 2021/0245212 A1    Aug. 12, 2021

(51) Int. Cl.
*B01D 3/14* (2006.01)
*B01D 11/02* (2006.01)
(Continued)

(52) U.S. Cl.
CPC ............... *B09C 1/02* (2013.01); *B01D 3/14* (2013.01); *B01D 11/0203* (2013.01);
(Continued)

(58) Field of Classification Search
CPC ........... B09C 1/02; B09C 1/002; B09C 1/005; B09C 1/025; B09C 1/06; B09C 2101/00; B01D 17/0217; B01D 11/0203; B01D 11/0284; B01D 11/0296; B01D 11/0257; B01D 11/0288; B01D 3/14; B01D 2221/04; B01D 2221/08; B01D 3/00;
(Continued)

(56) References Cited

U.S. PATENT DOCUMENTS 2,806,770 A * 9/1957 Hutchins ............... C01B 17/033
                                                 423/578.2
3,298,932 A * 1/1967 Bauer ................... B01D 1/2856
                                                 203/11
(Continued)

FOREIGN PATENT DOCUMENTS

CA          2091502 C      5/1999
CA          2358805 C      2/2003
(Continued)

*Primary Examiner* — Joseph W Drodge
(74) *Attorney, Agent, or Firm* — David Guerra

(57) ABSTRACT

A system, process and method for remediating contaminated soil and solvent recovery. A solvent mixture including a polar and a non-polar solvent is mixed with contaminated soil in mixing vessels, allowing the solvent mixture to extract contaminates from the soil. The solvent mixture is separated from the soil using bicanting units to form a solvent stream and a soil stream. The soil stream goes through air sparging in a dryer to remove residual solvent vapor. Water and/or micro-fines are extracted from the solvent stream using a centrifuge. The solvent stream undergoes distillation in a distillation unit to remove the containments from the solvent stream, while recovering separately the solvent mixture and a product. The recovered solvent mixture can be recycled back to the mixing vessels. The contaminates can be BTEX or F1-F4 hydrocarbons, and the product can be oil or other hydrocarbons. The system can be mobile.

18 Claims, 4 Drawing Sheets

(51) Int. Cl.
*B01D 17/02* (2006.01)
*B09C 1/02* (2006.01)
*C02F 1/26* (2006.01)
*C02F 103/06* (2006.01)
*C02F 101/32* (2006.01)

(52) U.S. Cl.
CPC ...... *B01D 11/0257* (2013.01); *B01D 11/0284* (2013.01); *B01D 11/0288* (2013.01); *B01D 11/0296* (2013.01); *B01D 17/0217* (2013.01); *B01D 2221/04* (2013.01); *B01D 2221/08* (2013.01); *C02F 1/26* (2013.01); *C02F 2101/322* (2013.01); *C02F 2103/06* (2013.01)

(58) Field of Classification Search
CPC ... B01D 11/028; B01D 11/0292; B01D 11/04; B01D 11/0488; B01D 11/0492; B01D 15/00; B01D 17/12; B01D 19/00; B01D 19/0005; B01D 19/0068; B01D 21/26; B01D 21/262; B01D 21/28; C02F 2101/322; C02F 2103/06; C02F 1/26; C02F 1/02; C02F 1/04; C02F 1/043; C02F 1/20; C02F 1/38; C02F 9/00; C02F 2001/007; B08B 3/00; B08B 3/04; B08B 3/08; B08B 3/10; B08B 3/102; B08B 7/00; B08B 7/0064
USPC .......................................................... 210/241
See application file for complete search history.

(56) References Cited

U.S. PATENT DOCUMENTS

| | | | |
|---|---|---|---|
| 4,699,709 A | 10/1987 | Peck | |
| 4,869,825 A * | 9/1989 | Steiner | B01D 11/028 210/634 |
| 4,906,302 A | 3/1990 | Bruya | |
| 4,975,198 A | 12/1990 | Steiner | |
| 4,981,579 A * | 1/1991 | Paspek | B01D 11/02 208/13 |
| 5,026,432 A | 6/1991 | Johnson | |
| 5,053,082 A * | 10/1991 | Flanigan | B01D 11/0223 134/25.1 |
| 5,080,721 A * | 1/1992 | Flanigan | B01D 11/028 134/2 |
| 5,092,983 A * | 3/1992 | Eppig | B01D 11/02 208/13 |
| 5,340,406 A | 8/1994 | Fearon | |
| 5,453,133 A | 9/1995 | Sparks et al. | |
| 5,518,621 A * | 5/1996 | Holcombe | B09C 1/02 210/634 |
| 5,599,137 A * | 2/1997 | Stephenson | B03B 5/623 405/128.75 |
| 5,906,748 A * | 5/1999 | Kansa | B09C 1/02 210/640 |
| 6,027,651 A * | 2/2000 | Cash | D06F 43/08 210/662 |
| 6,145,666 A | 11/2000 | Bones | |
| 6,210,078 B1 * | 4/2001 | Redwine | B01D 61/16 134/28 |
| 7,201,804 B2 | 4/2007 | Tunnicliffe et al. | |
| 8,557,565 B2 | 10/2013 | Wavrek et al. | |
| 2004/0144721 A1 | 7/2004 | D'Angeli et al. | |
| 2005/0000903 A1 | 1/2005 | Mecs et al. | |
| 2010/0150658 A1 | 6/2010 | Bilhete et al. | |
| 2013/0295650 A1 * | 11/2013 | O'Driscoll | B09C 1/10 435/262.5 |
| 2017/0355001 A1 | 12/2017 | Hernandez et al. | |
| 2018/0207554 A1 | 7/2018 | Ross et al. | |
| 2018/0333757 A1 * | 11/2018 | Scalley | B01D 11/028 |
| 2019/0046895 A1 * | 2/2019 | Nocera, Jr. | B01D 11/0257 |

FOREIGN PATENT DOCUMENTS

| | | | |
|---|---|---|---|
| EP | 2087947 | A2 | 8/2009 |
| JP | 2003300058 | A | 10/2003 |
| JP | 2004057886 | A | 2/2004 |
| WO | 9527572 | A1 | 10/1995 |
| WO | 03031087 | A2 | 4/2003 |

* cited by examiner

HIGH RATE HYDROCARBON SOLVENT EXTRACTION SYSTEM, PROCESS AND METHOD

BACKGROUND

Technical Field

The present technology relates to a high rate hydrocarbon solvent extraction system, process and method for use in connection with extracting hydrocarbons from contaminated material such as soil or water at high removal rates utilizing a blend of polar and non-polar solvents, with solvent recovery and reuse. In some embodiments, the present technology utilizes a mobile system for remediating soil or water by extracting hydrocarbons at a high removal rate.

Background Description

The management of contaminated sites in particular with the remediation of soil is designed to achieve positive and useful outcomes. These outcomes can be essentially, pollution prevention to avoid impairment of, or damage to, the environment, human health or safety, or property. Another outcome can be health protection to take action on contaminated sites that is commensurate with risk to human health and the environment. While another outcome can be for productive use to encourage remediation and return of contaminated sites to productive use.

It is highly acknowledged that the remediation of contaminated soil, particularly soil contaminated with hydrocarbons, is beneficial for protecting environmental sites, animal health and/or population health. There is a further financial benefit in remediating contaminated soil in reusing the soil for other projections, backfilling or any other construction, industrial or environmental projects. However, the remediated soil must be decontaminated to a level required under strict government regulations. For example, regulatory requirements related to substance release, remediation and reclamation can be found in the Canadian Environmental Protection and Enhancement Act (EPEA) and from the United States Environmental Protection Agency. The purpose of these strict regulations is to support and promote the protection, enhancement and wise use of the environment.

Contaminants can be introduced into the environment in a number of ways. Leaking pipelines and storage tanks, spills and improper discarding are common sources of contamination. Contaminated soil and groundwater may be a source of contamination to other areas of a site if the contaminants are mobile. Removal or management of these sources is a necessary part of contaminated site management. Soil or groundwater with naturally elevated substance concentrations may become a source of contamination if it is redistributed. This can be avoided by proper characterization and handling of soil prior to redistribution.

This can be true for soil or water associated with the oil and gas industry, where the surrounding soil or water is heavily containment with hydrocarbons, such as, Benzene, Toluene, EthylBenzene or Xylene (BTEX) as well as F1,F2, F3,F4 hydrocarbons which are C6-C54 Alkane and Alkene hydrocarbons. This contamination can further be associated with natural or man-made ponds, harbors, pools and the like.

Known systems utilize large plants at remote locations, where the soil must be transported in by trucks or rail to be processed, and then transported out for reuse or other financial remunerations. Some systems maybe portable, but they require many large trucks for the transportation of all components, along with the possible need for a crane for positioning these components. These mobile systems may also require a water source, and the solvents used may need to be transported off site for recovery.

These known systems can utilize or include known processes, such as, soil-washing, biological remediation techniques, solidification/stabilization processes, solvent based treatment or a solvent/cosolvent extraction.

However, each of these known processes includes their own specific disadvantages, and they do not allow for a mobile and closed-looped system with reduced energy/power operational input.

While the above-described devices fulfill their respective, particular objectives and requirements, the aforementioned patents do not describe a hydrocarbon extraction soil remediation system and method that allows extracting hydrocarbons from soil at high removal rates utilizing polar and non-polar solvents. These known systems, processes and methods have many disadvantages. Some of these disadvantages are that they are not mobile. They are not closed loop systems utilizing minimal energy input. They require a substantial amount of water and/or energy input. These known processes do not utilize a polar and non-polar solvent blend capable of boiling at low temperatures by design.

Therefore, a need exists for a new and novel hydrocarbon extraction soil remediation system and method that can be used for extracting hydrocarbons from soil at high removal rates utilizing polar and non-polar solvents. In this regard, the present technology substantially fulfills this need. In this respect, the hydrocarbon extraction soil remediation system and method according to the present technology substantially departs from the conventional concepts and designs of the prior art, and in doing so provides an apparatus primarily developed for the purpose of extracting hydrocarbons from soil at high removal rates utilizing polar and non-polar solvents.

BRIEF SUMMARY OF THE PRESENT TECHNOLOGY

In view of the foregoing disadvantages inherent in the known types of remediation systems, processes and methods now present, the present technology provides a novel high rate hydrocarbon solvent extraction system, process and method, and overcomes the above-mentioned disadvantages and drawbacks of the known systems, processes and methods. As such, the general purpose of the present technology, which will be described subsequently in greater detail, is to provide a new and novel hydrocarbon extraction soil remediation system and method and method which has all the advantages of the known systems and processes mentioned heretofore and many novel features that result in a high rate hydrocarbon solvent extraction system, process and method which is not anticipated, rendered obvious, suggested, or even implied by the known systems, processes and methods, either alone or in any combination thereof.

According to one aspect of the present technology, the present technology can include a hydrocarbon solvent extraction and recovery system including one or more mixing vessels configured to mix contaminated material and a solvent mixture to form a slurry. The solvent mixture can include a polar solvent and a non-polar solvent. One or more bicanting units can be in communication with at least one of the mixing vessels, respectively, and can be configured to separate a solvent stream and a material stream. The solvent stream can include the solvent mixture and contaminants extracted from the contaminated material by the solvent mixture. An air sparging unit can be configured to receive the material stream from at least one of the bicanting units and to remove residual solvent vapor from the material stream to provide remediated material. A centrifuge can be in communication with the bicanting units, and can be configured to receive the solvent stream and remove water or micro-fines from the solvent stream. A distillation unit can be configured to receive the solvent stream from the centrifuge and to recover the solvent mixture and a hydrocarbon product from the solvent stream. A solvent recirculation means can be configured to recirculate at least a portion of the solvent mixture from the distillation unit to the mixing vessels.

According to another aspect, the present technology can include a process for hydrocarbon solvent extraction and recovery. The process can include steps of mixing contaminated material with a solvent mixture in one or more mixing vessels, where the solvent mixture can include a polar solvent and a non-polar solvent. Extracting contaminants from the contaminated material by the solvent mixture. Separating of the solvent mixture to form a solvent stream and a material stream. Air sparging the material stream in a dryer to remove residual solvent vapor from the material stream to produce remediated material. Removing water or micro-fines from the solvent stream. Removing by distillation the containments from the solvent stream utilizing a distillation unit. Recovering separately the solvent mixture and a hydrocarbon product from the distillation unit. Recirculating the recovered solvent mixture to the mixing vessels. The contaminants can be one or more selected from the group consisting of benzene, toluene, ethyl-benzene, xylene, and F1-F4 hydrocarbon fractions.

In another aspect, the present technology can include a method of hydrocarbon solvent extraction and recovery using a system including one or more mixing vessels configured to mix contaminated material and a solvent mixture to form a slurry. The solvent mixture can include a polar solvent and a non-polar solvent. One or more bicanting units can be configured to separate a solvent stream and a material stream. The solvent stream can include the solvent mixture and contaminants extracted from the contaminated material by the solvent mixture. An air sparging unit can be configured to receive the material stream from at least one of the bicanting units and to remove residual solvent vapor from the material stream to provide remediated material. A centrifuge can be in communication with the bicanting units, and can be configured to receive the solvent stream and remove water or micro-fines from the solvent stream. A distillation unit can be configured to receive the solvent stream from the centrifuge and to recover the solvent mixture and a hydrocarbon product from the solvent stream. A solvent recirculation means can be configured to recirculate at least a portion of the solvent mixture from the distillation unit to the mixing vessels.

In yet still another aspect, the present technology can include a method of remediating soil and recovering a solvent mixture. The method can include steps of mixing contaminated soil with a solvent mixture in one or more mixing vessels, where the solvent mixture can include a polar solvent and a non-polar solvent. Extracting contaminants from the contaminated soil by the solvent mixture. Separating the solvent mixture from the soil to form a solvent stream and a soil stream utilizing one or more bicanting units. Air sparging the soil stream in a dryer to remove residual solvent vapor from the soil stream and to produce remediated soil. Removing water or micro-fines from the solvent stream utilizing a centrifuge. Removing by distillation the containments from the solvent stream utilizing a distillation unit. Recovering separately the solvent mixture and a hydrocarbon product from the distillation unit. Recirculating the recovered solvent mixture to the mixing vessels.

In some embodiments, the mixing vessels can include a slurry recirculation line configured to recirculate the slurry prior to entering the bicanting units, respectively, back to the mixing vessels.

Some embodiments of the present technology can include a solvent condenser in communication with the air sparging unit and the centrifuge. The solvent condenser can be configured to receive and condense the residual solvent vapor. The centrifuge can receive the condensed residual solvent vapor.

Some embodiments of the present technology can include a boiler that can be configured to receive a first return water from the distillation unit and to produce steam that can be provided to the distillation unit.

Some embodiments of the present technology can include a water cooling unit that can be configured to receive a second return water from the distillation unit and a third return water from the solvent condenser, and to provide cooled water to the distillation unit and to the solvent condenser.

Some embodiments of the present technology can include an air heat exchanger that can be configured to receive steam from the boiler and to provide a fourth return water to the boiler. The air heat exchanger can be configured to heat air and provide the heated air to the air sparging unit.

Some embodiments of the present technology can include a $CO_2$ washing unit that can be configured to receive the remediated material from the air sparging unit and to extract residual contaminates from the remediated material.

Some embodiments of the present technology can include one or more mobile units configured to support the system.

In some embodiments, the contaminants can be one or more selected from the group consisting of benzene, toluene, ethyl-benzene, xylene, and F1-F4 hydrocarbon fractions.

In some embodiments, the polar solvent can be one or more selected from the group consisting of acetone, methyl ethyl ketones and isopropyl alcohol, and the non-polar solvent can be one or more selected from the group consisting of pentane, butane, propane, ethane and methane.

In some embodiments, the polar solvent is acetone, and the non-polar solvent is pentane.

In some embodiments of the present technology, the distillation can be conducted at a pressure no greater than 1 atmosphere.

In some embodiments of the present technology, the distillation can be conducted at negative pressure.

In some embodiments of the present technology, the solvent mixture can be configured to have a boiling temperature of no more than 30° C. at 1 atmospheric pressure.

In some embodiments of the present technology, the solvent mixture that is recovered can be recycled to the mixing vessels.

In some embodiments of the present technology, the material stream that is separated from the slurry can be recycled to the mixing vessels.

In some embodiments of the present technology, the solvent mixture and the material stream that is recycled to the mixing vessels can be combined prior to entering the mixing vessels.

In some embodiments of the present technology, the residual solvent vapor removed from the material stream can be condensed by a solvent condenser, and the condensed solvent vapor can be provided with the solvent stream.

In some embodiments of the present technology, the contaminated material can be contaminated soil or water, and the remediated material can be remediated soil or water.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel hydrocarbon extraction soil remediation system and method that has all of the advantages of the known soil remediation or solvent recovery systems and methods, and none of the disadvantages.

It is another object of the present technology to provide a new and novel hydrocarbon extraction soil remediation system, process and method that may be easily and efficiently manufactured and marketed.

An even further object of the present technology is to provide a new and novel hydrocarbon extraction soil remediation system that has a low cost of manufacture and operation with regard to both materials and labor, and which accordingly is then susceptible of low prices of sale to the consuming public, thereby making such hydrocarbon extraction soil remediation system and method economically available to the buying public.

Still another object of the present technology is to provide a hydrocarbon extraction soil remediation system and method for extracting hydrocarbons from soil at high removal rates utilizing polar and non-polar solvents. This allows for providing a mobile system that can be easily transported to a site, which requires very low energy input while generating low greenhouse gases, with all operational solvents being recovered and reused.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PRESENT TECHNOLOGY

Figure 1:
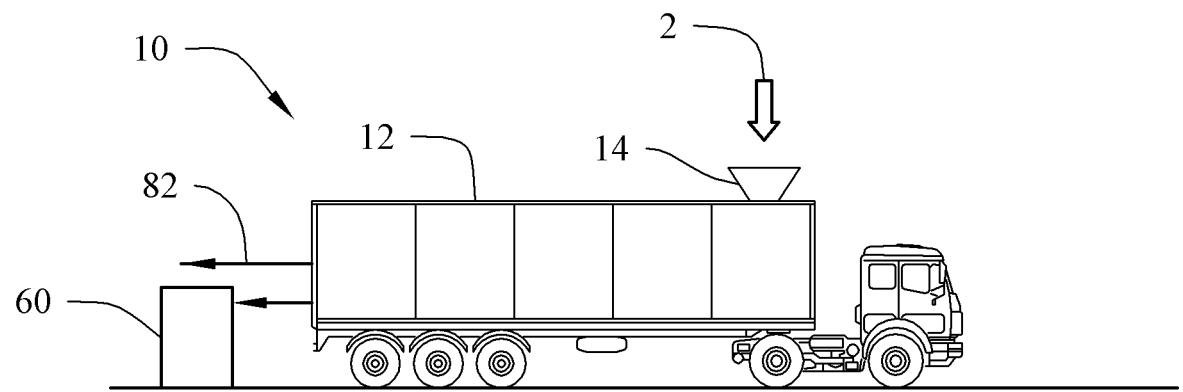
FIG. 1 is a side plane view of an embodiment of the hydrocarbon extraction soil remediation system and method constructed in accordance with the principles of the present technology as a mobile unit.

Referring now to the drawings, and particularly to FIGS. 1-5, an embodiment of the high rate hydrocarbon solvent extraction system, process and method of the present technology is shown and generally designated by the reference numeral 10. The present technology can include a process or method of remediating contaminated material, such as soil or water, with high removal rates of hydrocarbons, such as but not limited to, benzene, toluene, ethylbenzene and/or xylenes (BTEX) as well as F1, F2, F3 and/or F4 hydrocarbons which are C6-C54 and greater.

BTEX can be classified as priority pollutants regulated by many environmental organizations around the world. BTEX are monocyclic aromatics that are highly water soluble and volatile compared to their aliphatic counterparts. Small aromatics frequently enter air, soil, sediments, and ground water due to accidental oil spills, leakage of gasoline and other petroleum fuels from underground storage tanks and pipelines, and improper oil-related waste disposal. Some of these volatile aromatics are of little importance or interest. However, because of their potential acute toxicity and carcinogenic health hazards to humans, plants, and aquatic and animal life, BTEX are often required to be analyzed as one group whenever a hydrocarbon fuel is suspected to have been spilled (especially in relatively confined areas).

BTEX occurs naturally in crude oil and can be found in seawater near natural gas and petroleum deposits. BTEX compounds can further be created and used during the processing of petroleum products and during the production of consumer goods such as paints and lacquers, thinners, rubber products, adhesives, inks, cosmetics and pharmaceutical products. BTEX compounds are further used in fracking operations, which have led to regulations to control the amount of BTEX that can leach into water supplies.

The health effects of BTEX are widely known, with the extraction of BTEX from soil and/or water being of high priority to ensure the safety of plants, animals and humans. Some of the adverse health effects and characteristics of BTEX will be discussed.

Benzene is a six-carbon aromatic annulene with the chemical formula $C_6H_6$, and can have a role as a non-polar solvent. The benzene molecule is composed of six carbon atoms joined in a ring with one hydrogen atom attached to each. Benzene is a known carcinogen (cancer causing agent) that also damages bone marrow and the central nervous system. It is rapidly and efficiently absorbed and widely distributed throughout the body. Exposure to very high concentrations in air (10,000,000 ppb and above) can cause death. Lower levels (700,000-3,000,000 ppb) can cause drowsiness, dizziness, rapid heart rate, headaches, tremors, confusion, and unconsciousness. Long-term exposure to benzene can cause cancer of blood forming organs (leukemia). Eating foods or drinking liquids containing high levels of benzene can cause vomiting, irritation of the stomach, dizziness, sleepiness, convulsions, rapid heart rate, coma, and death. The health effects that may result from eating foods or drinking liquids containing lower levels of benzene are not known.

Toluene is an aromatic hydrocarbon being a mono-substituted benzene derivative, consisting of a $CH_3$ group attached to a phenyl group. Toluene is readily absorbed from the gastrointestinal tract after ingestion, and is distributed preferentially in adipose tissue, then the kidneys, liver and brain. The main effect of toluene is on the brain and nervous system, with fatigue and drowsiness being the most obvious symptoms. Toluene can have a role as a non-polar solvent, a cholinergic antagonist, a neurotoxin and a fuel additive.

Ethylbenzene is an alkylbenzene carrying an ethyl substituent, being an organic compound with the formula $C_6H_5CH_2CH_3$, and is a constituent of coal tar and petroleum. Ethylbenzene is readily absorbed from the human gastrointestinal tract. Animal studies show enlargement of the liver and kidney at high doses (400 mg/kg body weight per day). Liver effects were also observed in a number of inhalation studies. In general, acute and chronic toxicity is low in humans although symptoms such as irritation of eyes and the respiratory tract have been reported at high levels of exposure in air. Exposure to relatively low concentrations of ethylbenzene for several days to weeks resulted in potentially irreversible damage to the inner ear and hearing of animals.

Xylene is an aromatic hydrocarbon with a chemical formula of $(CH_3)_2C_6H_4$. Xylenes are readily absorbed after inhalation. Both short- and long-term exposure to high concentrations of xylene can also cause a number of effects on the nervous system, such as headaches, lack of muscle coordination, dizziness, confusion, and changes in one's sense of balance as well as irritate the eyes and respiratory tract.

The present technology can also be utilized to remove F1-F4 fractions from soil and/or ground water alone or in combination with BTEX extraction. The Canada-Wide Standard for Petroleum Hydrocarbons requires that four fractions be determined analytically to decide if the site meets acceptable criteria for various land uses. These petroleum hydrocarbon fraction ranges based on specified ranges of equivalent carbon number (ECN) and total recoverable hydrocarbon (TRH) analysis. The divisions are based on consideration of analytical factors, physical and chemical properties and the availability of toxicity data. The four fractions, F1 through F4 are:

F1, i.e., C6 to C10, from which the results of a BTEX analysis have been subtracted, described as F1-BTEX.

F2, i.e., >C10 to C16, which naphthalene has been subtracted, described as F2-napth.

F3, i.e., >C16 to C34, less the PAHs phenanthrene, benz(a)anthracene, benzo(b)fluoranthene, benzo(k) fluoranthene, benzo(a)pyrene, fluoranthene, dibenz(a, h)anthracene, indeno(1,2,3-c,d)pyrene and pyrene, if analyzed. This is described as F3-PAH.

F4, >C34, or F4G being gravimetric heavy hydrocarbons, whichever is the greater result.

Figure 2:
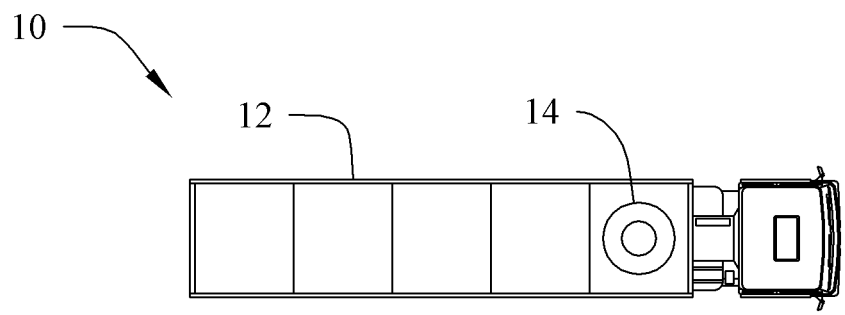
FIG. 2 is a top elevational view of the mobile unit of the present technology.

To efficiently and effectively remove any of the above containments from soil and/or ground water, the present technology utilizes a blend of one or more polar solvents, one or more medium-low polar solvents and/or one or more non-polar solvents, along with solvent recovery for reuse, thereby making the present technology ideal for use as a mobile processing system. In FIGS. 1 and 2, a new and novel hydrocarbon extraction soil remediation system, process and method 10 of the present technology for extracting hydrocarbons from contaminated material, such as but not limited to soil, at high removal rates utilizing polar and non-polar solvents is illustrated and will be described.

As background and in the exemplary, a solvent can be a liquid that serves as the medium for a reaction. It can serve two purposes:

Non-participatory to dissolve the reactants. Polar solvents are effective for dissolving polar reactants (such as ions); nonpolar solvents are effective for dissolving nonpolar reactants (such as hydrocarbons).

Participatory as a source of acid (proton), base (removing protons), or as a nucleophile (donating a lone pair of electrons).

A polar solvent can have large dipole moments (aka "partial charges"); they contain bonds between atoms with very different electro negativities, such as oxygen and hydrogen. Non-polar solvents have little to no dipole moment with low dielectric constants. There can be medium-low polar solvents that can be classified as either a polar solvent and/or a non-polar solvent.

Solvents that can be utilized with or in the present technology can be polar, non-polar, medium-low polar, aprotic or protic. The solvents can be selected from, but not limited to, 1,1-dichloroethane, 1,4-dioxane, 1-butanol, 1-heptanol, 1-hexanol, 1-octanol, 1-pentanol, 1-propanol, 2-aminoethanol, 2-butanol, 2-butanone, 2-pentanol, 2-pentanone, 2-propanol, 3-pentanol, 3-pentanone, acetic acid (AcOH), acetone, acetonitrile (MeCN), acetyl acetone, aniline, anisole, benzene, benzonitrile, benzyl alcohol, butane, carbon disulfide, carbon tetrachloride, chlorobenzene, chloroform, cyclohexane, cyclohexanol, cyclohexanone, dichloromethane (DCM), diethyl ether, diethylamine, diethylene glycol, diglyme (diethylene glycol dimethyl ether), dimethoxyethane (DME; glyme), dimethyl sulfoxide (DMSO), dimethylformamide (DMF), dimethylphthalate, dimethylsulfoxide (DMSO), di-n-butylphthalate, dioxane, ethane, ethanol (EtOH), ether, ethyl acetate (EtOAc), ethyl acetoacetate, ethyl benzoate, ethylene glycol, formic acid, glycerin, heptane, hexafluoroisopropanol, hexamethylphosphoramide (HMPA), hexane, hex-methyl-phosphoric triamide (HMPT), i-butanol, isopropanol (IPA), isopropyl alcohol, methane, methanol (MeOH), methyl acetate, methyl t-butyl ether (MTBE), methylene chloride, methyl ethyl ketones, N,N-dimethylaniline, N,N'-Dimethylpropyleneurea (DMPU), n-butanol, nitromethane, N-methyl-2-pyrrolidinone (NMP), n-methylpyrrolidone, orthodichlorobenzene (ODCB), pentane, petroleum ether (ligroine), propane, propylene carbonate (PC), o-xylene, m-xylene, p-xylene, pyridine, sulfolane, t-butyl alcohol tetrahydrofuran (THF), toluene, triethyl amine, trifluoroethanol, water, and the like.

Referring to FIGS. 1 and 2, the high rate hydrocarbon solvent extraction system 10 of the present technology can be used in connection with extracting hydrocarbons from contaminated soil at high removal rates utilizing polar and non-polar solvents, with solvent recovery and reuse. The system 10 can include one or more mobile vehicles, trailers or units 12 configured to include all components necessary for remediating material utilizing the present technology process or method. For simplicity and non-limited, all references to contaminated ground water, material and/or soil 2 will be made as contaminated soil, with the appreciation that such reference can be associated with ground water, seawater, river or lake water, well water, soil, earth, rocks, agglomerate, sediments and other earth material and/or aggregates.

In the exemplary, the mobile unit 12 can include an input 14 for receiving the contaminated soil 2. The input 14 can be, but not limited to, a funnel, a hopper, a conduit, a conveyance system, an auger, a chute or any means of receiving the contaminated soil 2.

The contaminated soil 2 can be processed through the components of the mobile unit or units 12, with remediated ground water or soil 82 and recovered hydrocarbons 60 exiting therefrom as products of the present technology process, which will be described in more detail below. The mobile unit or units 12 can be transported to sites or location including contaminated ground water and/or soil, thereby providing a cost effective means for remediation.

Figure 3:
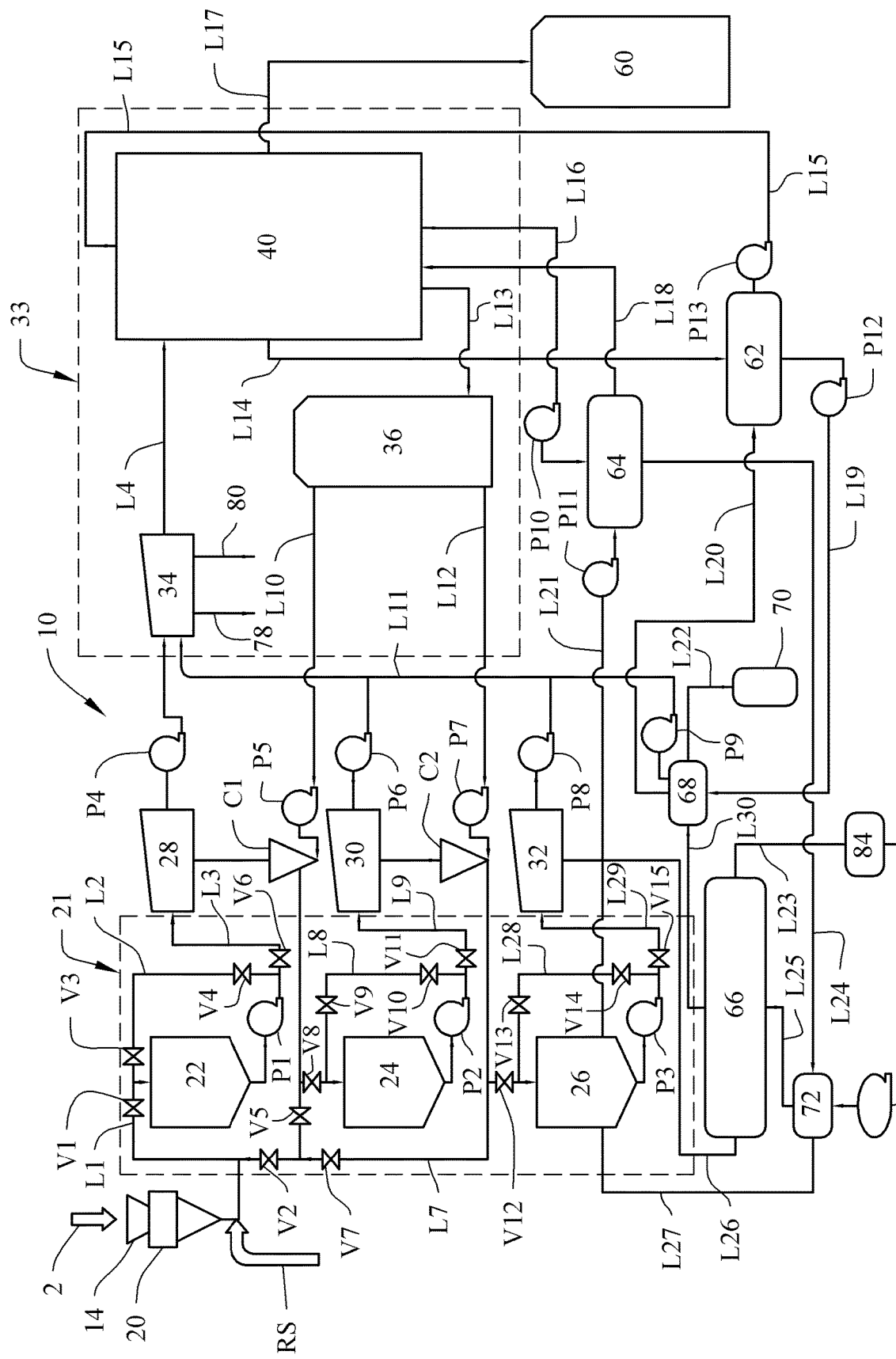
FIG. 3 is a schematic diagram of the system for carrying out the process or method of the present technology.

Referring to FIG. 3, the components of the present technology will be described, where it can be appreciated that these components can be included with the mobile unit or units 12. The input 14 receives the contaminated soil 2 for transfer to a clump breaker 20. The clump breaker 20 can be referred to as lump breakers or lump crushers, and are size reduction machines that crush materials with blades, wheels or teeth. The clump breaker 20 can be configured to reduce lumps that can be associated with the contaminated soil 2, thereby producing minimal and constant sized particles of the contaminated soil for effective subsequent processing, transfer and/or mobility. Downstream of the clump breaker 20, solvent or recovered solvent RS can be introduced with the contaminated soil 2 prior to entering a mixing assembly 21.

The mixing assembly 21 can include multiple mixing vessels 22, 24, 26 each capable of mixing the contaminated soil 2 and recovered solvent RS. A first stage of the mixing assembly 21 can include one or more semi-closed looped circuits of mixing vessels 22, 24, with a final stage of mixing assembly 21 including a final mixing vessel 26 that transfers processed soil out from the mixing assembly 21 to subsequent downstream processing components.

The contaminated soil 2 and recovered solvent RS can enter a first mixing vessel 22 by a first line L1 via valve V1, where the contaminated soil 2 and recovered solvent RS are mixed for a predetermined time to create a slurry and allowing the solvent RS to extract hydrocarbons from the contaminated soil 2. A first pump P1 can draw the slurry from the first mixing vessel 22 to a first return line L2 and a first bicanting line L3. The first return line L2 can recirculate all or a portion of the slurry back to the first mixing vessel 22 via valve V4 located near a location where the first return line L2 branches or splits from the first bicanting line L3, and valve V3 upstream of entering the first mixing vessel 22 and/or merging with the first line L1.

The first bicanting line L3 can transfer all or a portion of the slurry from the first pump P1 to a first decanting or bicanting unit 28 via a valve V6 downstream of the first return line L2. The first bicanting unit 28 can be configured to separate the solvent including at least a portion of the extracted hydrocarbons, water and/or micro-fines/solids from the slurry. The extracted solvent mixture can be transferred from the first bicanting unit 28 to a centrifuge 34 via a fourth pump P4, while the remaining slurry can be transferred to a first combining unit C1 where it can be combined with additional recovered solvent from a clean solvent tank 36 via line L10 and a fifth pump P5.

The combined slurry and additional recovered solvent can then be transferred to a second mixing vessel 24 via valve V8 and/or back to the first line L1 via valves V2 and V5 for additional processing in the first mixing vessel 22. The recycling of the combined slurry and additional recovered solvent back to the first mixing vessel 22 allows for additional hydrocarbon solvent extraction if needed, as controlled by valves V1, V2, V5 and V6.

The combined slurry and additional recovered solvent can enter the second mixing vessel 24 via valve V8 for still further solvent extraction allowing the solvent to extract hydrocarbons from the contaminated soil post processing by the first mixing vessel 22. A second pump P2 can draw the slurry from the second mixing vessel 24 to a second return line L8 and a second bicanting line L9. The second return line L8 can recirculate all or a portion of the slurry back to the second mixing vessel 24 via valve V10 located near a location where the second return line L8 branches or splits from the second bicanting line L9, and valve V9 upstream of entering the second mixing vessel 24 and/or downstream of the valve V8.

The second bicanting line L9 can transfer all or a portion of the slurry from the second pump P2 to a second bicanting unit 30 via a valve V11 downstream of the second return line L8. The second bicanting unit 30 can be configured to separate the solvent including at least a portion of the extracted hydrocarbons, water and/or micro-fines/solids from the slurry. The extracted solvent mixture can be transferred from the second bicanting unit 30 to the centrifuge 34 via a sixth pump P6 and line L11, while the remaining slurry can be transferred to a second combining unit C2 where it can be combined with additional recovered solvent from the clean solvent tank 36 via line L12 and a seventh pump P7.

The combined slurry and additional recovered solvent can then be transferred to a final mixing vessel 26 via valve V12 and/or back to the first line L1 via valves V7 and V2 for additional processing in the first mixing vessel 22. The recycling of the combined slurry and additional recovered solvent from the second mixing vessel 24 back to the first mixing vessel 22 allows for additional solvent extraction of the hydrocarbons if needed, as controlled by valves V1, V2, V7 and V11.

The combined slurry and additional recovered solvent can enter the final mixing vessel 30 via the valve V12 for still further solvent extraction allowing the solvent to extract any remaining hydrocarbons from the contaminated soil post processing by the second mixing vessel 24. A third pump P3 can draw the slurry from the final mixing vessel 26 to a final return line L28 and a final bicanting line L29. The final return line L28 can recirculate all or a portion of the slurry back to the final mixing vessel 26 via valve V14 located near a location where the final return line L28 branches or splits from the final bicanting line L29, and valve V13 upstream of entering the final mixing vessel 26 and/or downstream of the valve V12.

The final bicanting line L29 can transfer all or a portion of the slurry from the third pump P3 to a third bicanting unit 32 via a valve V15 downstream of the final return line L28. The third bicanting unit 32 can be configured to separate the solvent including at least a portion of the extracted hydrocarbons, water and/or micro-fines/solids from the slurry. The extracted solvent mixture can be transferred from the third bicanting unit 32 to the centrifuge 34 via an eighth pump P8 and the line L11, while the remaining soil can be transferred to an air sparging unit including a dryer 66 via line L26. Line L26 can be, but not limited to, a screw conveyor, and air eductor or any other suitable conveyance means.

The dryer 66 can be, but not limited to, a fluid bed dryer, a torrent dryer, a rotary dryer and the like. The dryer 66 can be provided with hot air via a blower 74 in communication with an air heat exchanger 72, which then feeds the dryer 66 via line or conduit L25. The air heat exchanger 72 can receive steam from a boiler 64 via line L24 for heating the incoming air from the blower 74.

It can be appreciated that any number of mixing vessel circuits, similar to the above-described first and second mixing vessels 22, 24 can be utilized prior to entering the final mixing vessel 26. It can further be appreciated that a single mixing vessel with recirculation circuit, and a single bicanting unit can be configured for utilization with the present technology, thereby reducing components and cost. In this case, the soil stream exiting the bicanting unit could be transferred back to the mixing vessel and/or to the dryer 66.

The dryer 66 can be configured for performing air sparging to the soil, which is a remediation technique used for the treatment of contaminated soil and ground water. The air sparging by the dryer 66 can be a means by which to enhance the rate of mass removal from contaminated soil, and can involve injecting hot air from the blower 74 and air heat exchanger 72 into the soil, with the expectation that any remaining contaminants will undergo mass transfer (volatilization) from the soil. Because of buoyancy, the air bubbles generally move upward toward through the soil and into an upper zone of the dryer 66, where a soil-venting system is usually employed to capture the contaminated air stream, which is then sent the solvent condenser 68.

In the dryer 66, the soil is dried for predetermined amount of time for further solvent extraction in the form of solvent vapor and hot air. The solvent vapor/hot air can be transferred from the dryer 66 to a solvent condenser 68 via line 30, the solvent in the solvent vapor is condensed and transferred to the centrifuge 34 via a ninth pump P9 and the line L11.

A BTEX air scrubber 70 can be utilized to further remove BTEX from air exiting the solvent condenser 68 via line L22. The BTEX air scrubber 70 can be an optional unit and used when required dependent on regulatory guidelines for locations where the present system 10 is operated.

The dried and remediated soil 82 can exit the dryer 66 via line L23 for subsequent storage, reuse or sale. The remediated soil exiting the dryer 66 is suitable to meet and/or exceed government soil remediation limits associated with BTEX and/or F1-F4 hydrocarbons.

Optionally, if further remediation is needed, the remediated soil 82 exiting the dryer 66 can be transferred to a supercritical carbon dioxide ($CO_2$) washing unit 84 via line L23. It can be appreciated that the $CO_2$ washing unit 84 can be utilized in place of or in combination with the dryer 66. Supercritical $CO_2$ is a solvent for non-polar solids and volatile compounds. It is capable of dissolving hydrocarbons, polyaromatic hydrocarbons (PAH's), chlorinated hydrocarbons (such as PCB's and dioxins), phenols, chlorinated phenols and many pesticides and herbicides. Supercritical $CO_2$ can effectively extract non-polar compounds from all soil types. It can be appreciated that a polar compound, such as a short chain alcohol, can be added to the $CO_2$ to extract additional polar compounds, such as chlorophenols and some pesticides. The system 10 can be further configured to recover the $CO_2$ for reuse in the $CO_2$ washing unit 84 or for sequestration. It can be appreciated that this $CO_2$ washing cycle can be repeated multiple times utilizing a recirculation line and/or can be operated for a time period sufficient to remove any remaining non-polar solids and/or volatile compounds.

The bicanting units 22, 24, 26 can be, but not limited to, a centrifugal separator, a skimmer, and the like. In the exemplary, the bicanting units 22, 24, 26 can be a decanter centrifuge designed to remove unwanted solids and fine particles from virtually all kinds of sediments and muds. These decanter centrifuges are configured to handle large quantities of solids in the feed flow, as well as being able to cope with coarse, abrasive particles. They can efficiently remove a vast majority of fine particles, down to sizes of around 5 microns. In operation, the decanter centrifuge can rotate at speeds of up to 3650 rpm, producing centrifugal force of anywhere from 300 to 3574 G.

Further in the exemplary, the contaminated soil and solvent slurry can be fed into the decanter centrifuges, where the centrifugal force presses it outwards to form a layer around a wall. Liquid can flow out, with the aid of centrifugal forces. Since the soil in the slurry is heavier, they remain plastered against the wall, and are continuously removed by, for example, a screw conveyor. The soil can then exit the decanter centrifuge at one end or bottom, while the solvent with extracted hydrocarbons can exit at another end or top.

The present technology can include a solvent/hydrocarbon extraction and recovery sub-circuit 33 that includes the centrifuge 34 that can receive the solvent/hydrocarbon mixture from the bicanting units 28, 30, 32. It can be appreciated that multiple centrifuges can be utilized in series or in parallel arrangement. The centrifuge 34 can be, but not limited to, a disc-stack centrifuge, a decanter centrifuge, and the like. The centrifuge 34 can be configured to separate solids, and multiple liquid phases from the solvent/hydrocarbon mixture in one single continuous process, using extremely high centrifugal forces. In the present technology, the centrifuge 34 can be configured to separate waste water 78 and micro-fines/solids 80 from the solvent/hydrocarbon mixture, with the clean solvent/hydrocarbon mixture being transferred to a distillation unit 40 via line L14.

The waste water 78 can be reused in the present technology for use with the boiler 64 and/or the distillation unit 40, or discarded. The micro-fines/solids 80 can be discarded and/or sent for further processing for subsequent reuse or sale.

The distillation unit 40 can be configured to separate the hydrocarbons from the solvent/hydrocarbon mixture, thereby producing a hydrocarbon product 92 that can be transferred to storage 60 via line L17 for subsequent reuse or sale, and can further produce recovered solvent RS that can be transferred to the clean solvent storage tank 36 via the line L13. The clean solvent storage tank 36 can supply recovered solvent RS to the first line L1, to the first combining unit C1 via line L10 and the fifth pump P5, and to the second combining unit C2 via line L12 and the seventh pump P7.

The distillation unit 40 can be a closed system that can receive steam from the boiler 64 via line L18 and cool condensed water from a water chiller/cooler 62 via a thirteenth pump P13 and line L15. Return water can exit the distillation unit 40 via line L16 and tenth pump P10 to the boiler 64 for use to create the steam. Further, warm condenser water from the distillation unit 40 can be returned to the water chiller/cooler 62 via line L14.

Figure 4:
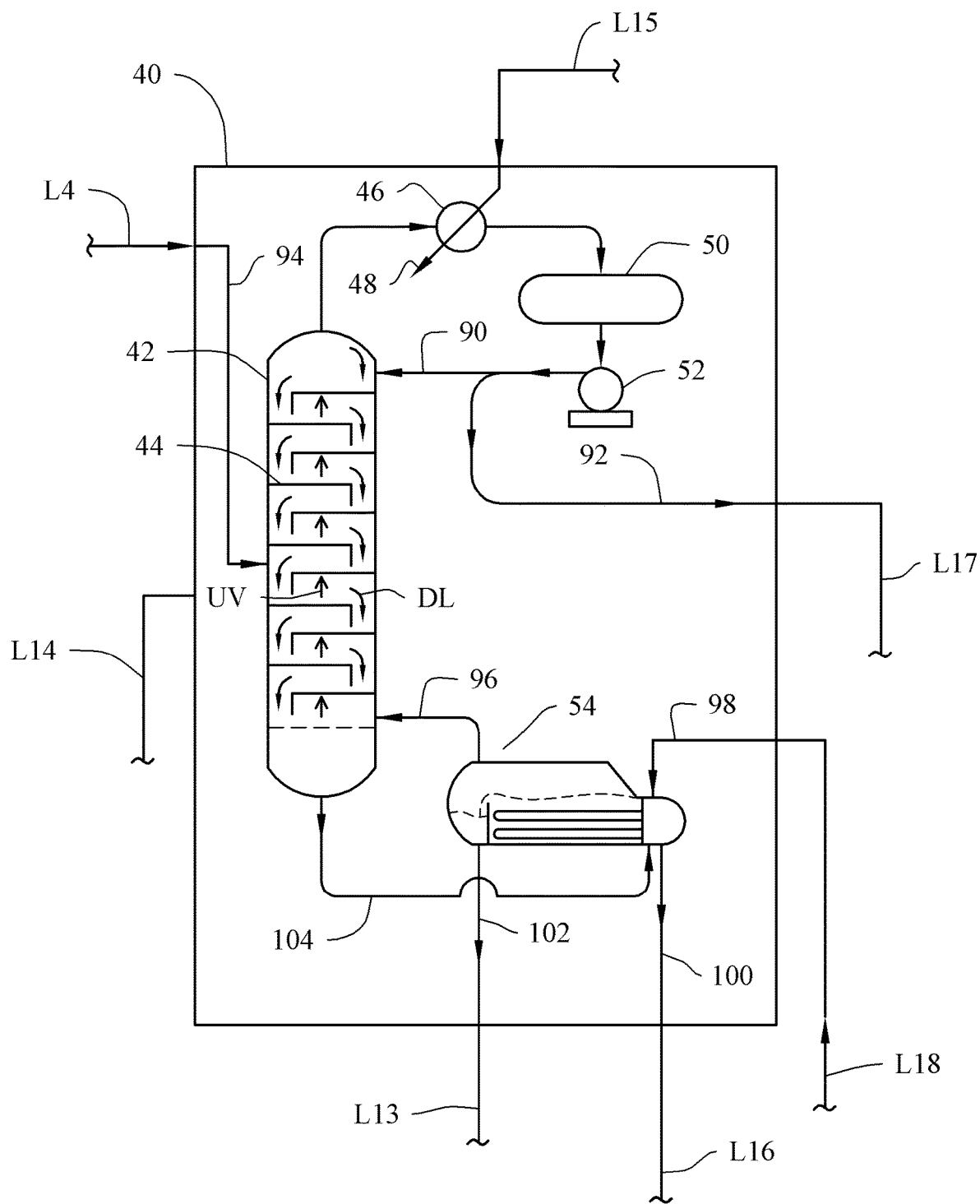
FIG. 4 is a schematic diagram of the components of the distillation unit.

As best illustrated in FIG. 4, the distillation unit 40 can include a distillation column 42 including multiple alternating and offset distillation plates 44 that create condensation zones and alternating channels. The distillation column can include an input 94 configured to receive the solvent/hydrocarbon mixture from the centrifuge 34 via the line L4. The distillation column 42 can be configured to motive an upward flowing vapor UV and a downward flowing liquid DL. The upward flowing vapor UV can collect at a top of the distillation column 42 and can be transferred to a condenser 46 that condenses the vapor prior to entering a reflux drum 50.

The reflux drum 50 can be a temporary reservoir that collects the condensate from the condenser 46, and may include an electrically controlled 3-way valve (1 in, 2 out) that diverts condensate reflux 90 flow to the distillation column 42 and/or the reboiler 54, and the hydrocarbon product 92 to the storage 60.

The condenser 46 can receive cool water from the chiller/cooler 62 via the line L15 to condense the vapor, and can return the warmed water 48 from the condenser 46 back to the cooler/chiller 62 via the line L14. A condenser pump 52 can withdraw the condensed product from the reflux drum 50 and pumps a reflux 90 to the distillation column 42 as the downward flowing liquid DL, and with the overhead hydrocarbon product 92 being the extracted hydrocarbons or BTEX can be transferred to the storage 60 via the line L17.

Reflux can refer to the portion of the overhead liquid product from the distillation column 42 that is returned to the upper part of the distillation column. Inside the distillation column 42, the downwardly flowing reflux liquid DL provides cooling and condensation of the upwardly flowing vapors UV thereby increasing the efficiency of the distillation column 42.

The distillation unit 40 can include a reboiler 54 that can receive steam 98 from the boiler 64 via the line L18 that creates vapor 96 that results in the upwardly flowing vapor UV. Liquids 104 that collect at the bottom of the distillation column 42 can be returned to the reboiler 54. The reboiler 54 creates a condensate 100 that is return water transferred to the boiler 64 via the line L16 and the tenth pump P10. Also created in the reboiler 54 are bottom products 102 being the recovered solvent that is transferred to the clean solvent tank 36 via the line L13. The reboiler 54 can provide the necessary vaporization for the distillation process. Heat is supplied to the reboiler 54 to generate vapor. The source of heat input can be any suitable fluid such as, but not limited to, steam. The vapor raised in the reboiler 54 can be re-introduced into the bottom of the distillation column 42.

It can be understood that as the mixture is heated and boils, vapor UV rises up the distillation column 42. The vapor condenses on the plates 44 inside the column 42 and runs back down DL into the liquid below, thereby refluxing the upwardly flowing distillate vapor UV. The hottest plate 44 is at the bottom of the distillation column 42 and the coolest plate is at the top. At steady state conditions, the vapor and liquid on each plate 44 is at equilibrium. Only the most volatile of the vapors stays in gaseous form all the way to the top. The vapor at the top of the distillation column 42 then passes into the condenser 46, where it cools until it condenses into a liquid. The separation can be enhanced with the addition of more plates 44. This distillation process can continue until all the most volatile components in the liquid feed 94 boil out of the mixture.

Referring again to FIG. 3, the boiler 64 can be provided for process and site heating in creating steam utilizable in the present technology. Returning cool water can be received in the boiler 64 from the reboiler 54 of the distillation unit 40 via the tenth pump P10 and the line L16, and from the air heat exchanger 72 via an eleventh pump P11 and line L27. The boiler 64 produces steam that can then be provided to the reboiler 54 via line L18, and to the air heat exchanger 72 via line L24, thereby by created a closed loop boiler circulation system. It can be appreciated that the boiler can be, but not limited to, a combustion burner boiler, an electric boiler, a solar boiler, a heat exchanging system and the like.

The water cooler/chiller 62 can be provided to cool the returning water 48 that has absorbed heat from the condenser 46 of the distillation unit 40 via the line L14, and to cool the returning water from the solvent condenser 68 via line L20. As result, the cooled water from the cooler/chiller 62 can then be provided to the condenser 46 of the distillation unit 40 via the thirteenth pump P13 and the line L15, and to the solve condenser 68 via a twelfth pump P12 and line L19. The cooler/chiller 62 cools the warm water returning from the distillation unit 40 and the solvent condenser 68 so it can then be provided to the distillation unit 40 and the solvent condenser 68, thereby by created a closed loop boiler circulation system. The cooler/chiller 62 can be, but not limited to, an electric cooling system, a refrigeration system, a heat exchanging system, a thermal extraction system, and the like.

Figure 5:
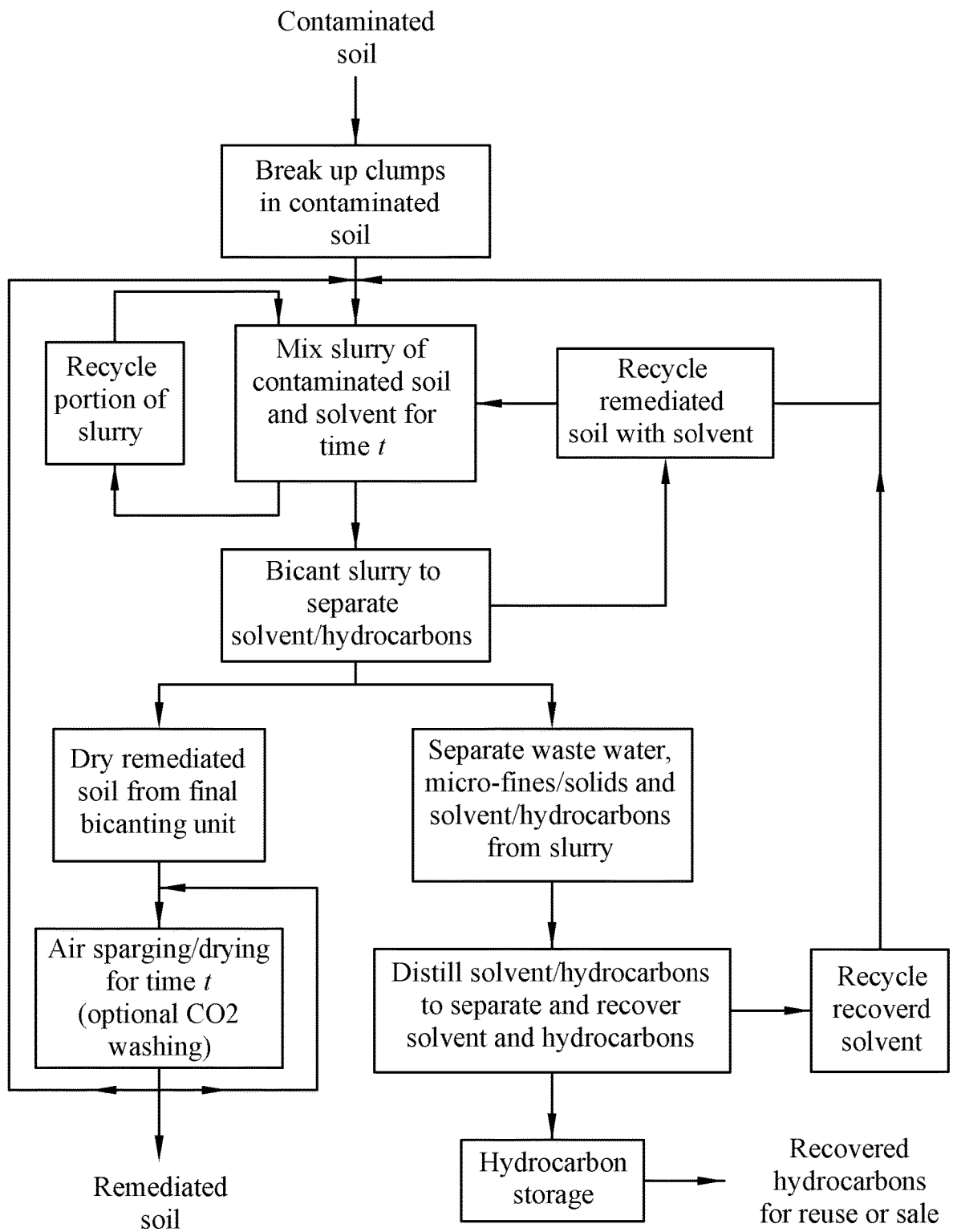
FIG. 5 is a flow diagram of a process of the present technology for remediating contaminated soil.

Utilizing the mobile system 10, it can now be understood that a broad process or method of remediating contaminated soil can be accomplished at lower costs and energy input that known systems. The broad process or method, as best shown in FIG. 5, can include breaking up clumps or lumps in received contaminated soil. This constant sized contaminated soil can be combined with solvent from the clean solvent tank to form a slurry that can be transferred to the mixing assembly. The solvent utilized in the process or method of the present technology can be a blend of at least one polar solvent and at least one non-polar solvent.

The slurry is mixed for a predetermined amount of time t for about, but not limited to, 1-30 minutes, preferably 5-20 minutes at room or ambient temperature, allow for solvent extraction of hydrocarbons or BTEX. All or a portion of the slurry can be recycled back to the mixing assembly if additional solvent extraction is required.

The slurry can then be sent to the bicanting unit to separate the solvent with extracted hydrocarbons from the soil. All or a portion of the remediated soil from the bicanting unit can be recycled back to the mixing assembly for additional hydrocarbon solvent extraction if required.

The remediated soil from the bicanting unit can then go through an air sparging or drying process to remove any remaining solvent and hydrocarbons or BTEX. Then the remediate soil can then exit the system for storage, reuse, sale or testing.

The solvent with extracted hydrocarbons from the bicanting unit can then be transferred to the disk-stack centrifuge to separate waste water and micro-fines/solids from the solvent. The solvent with extracted hydrocarbons can then be transferred to the distillation unit to separate the hydrocarbons or BTEX from the solvent. The solvent can then be recovered and recycled back and combined with the contaminated soil prior to mixing and/or with the remediate soil recycled from the bicanting unit.

The hydrocarbons or BTEX separated from the solvent can be transferred for storage, reuse or sale.

In the exemplary, a more detailed process or method for remediating contaminated soil utilizing system 10 will be described, with reference to the components of FIGS. 3 and 4.

Contaminated soil 2 can be received in the clump breaker 20, which breaks any clumps in the contaminated soil 2 to form a constant sized soil flow. After which, the contaminated soil 2 can be combined with solvent and/or recovered solvent RS from the clean solvent tank 36 to form a first slurry. The first slurry can be feed to the first mixing vessel 22 controlled by the valve V1. The first slurry is mixed in the first mixing vessel 22 for about 1-30 minutes, preferably 5-20 minutes at room or ambient temperature, allowing for sufficient time for the solvent blend to extract hydrocarbons or BTEX from the soil. The first slurry can then be pumped via the first pump P1 to the first bicanting unit 28 and/or back to the first mixing vessel 22. All or a portion of the first slurry can be recycled back to the first mixing vessel 22 if additional solvent extraction is required, and controlled by the valves V3 and V4. All or a portion of the first slurry can be transferred to the first bicanting unit 28 controlled by the valve V6.

The first bicanting unit 28 can separate all or a portion of the solvent with the extracted hydrocarbons or BTEX from the soil in the first slurry. The separated solvent can then be pumped using the fourth pump P4 to the centrifuge 34. The soil from the first bicanting unit 28 can be combined with recovered solvent from the clean solvent tank 36 to form a second slurry.

This second slurry can be transferred to the second mixing vessel 24 and/or back to the first mixing vessel 22 and/or to the final mixing vessel 26. All or a portion of the second slurry can be recycled back to the first mixing vessel 22 if additional solvent extraction is required, by combining the second slurry with the first slurry controlled by the valves V2 and V5. All or a portion of the second slurry can be transferred to the second mixing vessel 24, controlled by the valve V8. All or a portion of the second slurry can be transferred to the final mixing vessel 26, controlled by the valves V1, V2, V5, V7, V8 and V13.

If valve V8 is open, then all or a portion of the second slurry will enter the second mixing vessel 24 for mixing. The second slurry can be mixed in the second mixing vessel 24 for about 1-30 minutes, preferably 5-20 minutes at room or ambient temperature, allowing for sufficient time for the solvent blend to extract hydrocarbons or BTEX from the soil in the second slurry. The second slurry can then be pumped via the second pump P2 to the second bicanting unit 30 and/or back to the second mixing vessel 24. All or a portion of the second slurry can be recycled back to the second mixing vessel 24 if additional solvent extraction is required, and controlled by the valves V9 and V10. All or a portion of the second slurry can be transferred to the second bicanting unit 30 controlled by the valve V11.

Keeping with the second mixing vessel 24 being utilized, the second bicanting unit 30 can separate all or a portion of the solvent with the extracted hydrocarbons or BTEX from the soil in the second slurry. The separated solvent can then be pumped using the sixth pump P6 to the centrifuge 34. The soil from the second bicanting unit 30 can be combined with recovered solvent from the clean solvent tank 36 to form a third slurry.

Keeping with the second mixing vessel 24 being utilized, this third slurry can be transferred back to the first mixing vessel 22 and/or back to the second mixing vessel 24 and/or to the final mixing vessel 26. All or a portion of the third slurry can be recycled back to the first mixing vessel 22 if additional solvent extraction is required, by combining with the first slurry controlled by the valves V1, V2 and V7. All or a portion of the third slurry can be transferred to the second mixing vessel 24, controlled by the valves V5, V7 and V8. All or a portion of the third slurry can be transferred to the final mixing vessel 26, controlled by the valves V7 and V13.

The final mixing vessel 26 can receive a final slurry that can include the first slurry directly and/or the second slurry and/or the third slurry. All or a portion of the first slurry can be received in the final mixing vessel 26, controlled by the valves V2, V7 and V13. All or a portion of the second slurry can be received in the final mixing vessel 26, controlled by the valves V5, V7 and V13. All or a portion of the third slurry can be received in the final mixing vessel 26, controlled by the valves V13. The final slurry can be mixed in the final mixing vessel 26 for about 1-30 minutes, preferably 5-20 minutes at room or ambient temperature, allowing for sufficient time for the solvent blend to extract hydrocarbons or BTEX from the soil. The final slurry can then be pumped via the third pump P3 to the third bicanting unit 32 and/or back to the final mixing vessel 26. All or a portion of the final slurry can be recycled back to the final mixing vessel 26 if additional solvent extraction is required, and controlled by the valves V13 and V14. All or a portion of the final slurry can be transferred to the third bicanting unit 32 controlled by the valve V15.

The third bicanting unit 32 can separate any remaining solvent with the extracted hydrocarbons or BTEX from the soil in the final slurry. The separated solvent can then be pumped using the fourth pump P4 to the centrifuge 34. The soil exiting the third bicanting unit 32 is considered as remediated soil.

The remediated soil from the third bicanting unit 32 can then be transferred or conveyed to the dryer 66 for air sparging for about 10-120 minutes, preferable about 30-60 minutes retention time. The blower 74 can force air into the air heat exchanger 72 that can heat the air for the dryer 66. The air heat exchanger 72 can receive steam from the boiler 64 to heat the air. Steam or water can exit the air heat exchanger 72, which can then be pumped via the eleventh pump P11 back to the boiler for reheating.

In addition to or in place of air sparging, the remediated soil can go through one or more $CO_2$ washing 84 for additional solvent recovery.

After air sparging and/or $CO_2$ washing, the remediate soil can then be sent for testing to determine contamination levels. If the level below regulatory or predetermined standards for a specific use, then the remediated soil can be reused or sold. If the level is above regulatory or predetermined standards, then the remediated soil can be reintroduced into the system 10 for further processing.

Solvent vapor with or without hot air from the dryer 66 can be transferred to the solvent condenser 68, which can condense the solvent vapor for transfer via the ninth pump P9 to the centrifuge 34. The solvent condenser 68 can utilize cooled water from the chiller 62 via the twelfth pump P12 to condense the solvent vapor, resulting in heated water or steam that can be recirculated back to the chiller 62.

The BTEX air scrubber 76 can optionally be used to remove any remaining BTEX from the air escaping the solvent condenser 68.

The solvent with the extracted hydrocarbons from the first, second and/or third bicanting units 28, 30, 32 and the solvent condenser 68 can be transferred to the centrifuge 34. The centrifuge 34 can receive the solvent with the extracted hydrocarbons/BTEX and separate out waste water and any micro-fines/solids. The waste water can be discard or reused in the boiler 64 and/or in the cooler 62. The micro-fines/solids can be discarded or further processed for reuse.

The solvent with hydrocarbons can then be transferred to the distillation unit 40 where a hydrocarbon product can be separated from the solvent. In the distillation unit 40, the solvent with hydrocarbons are processed through the distillation column 42 where upwardly flowing vapors UV are passed through the condenser 46 to form a reflux 90 that is returned to the distillation column 42 and hydrocarbons/BTEX 92 that is transferred to the storage 60. In the distillation unit 42, downwardly flowing liquid DL is collected and passed through the reboiler 54 where the solvent 102 is removed and transferred to the clean solvent tank 36 for reuse.

The boiler 64 can receive condensate or water 100 from the reboiler 54 via the tenth pump P10 for utilization in steam production. The steam produced by the boiler 64 can be transferred to the reboiler 54 and/or the air heat exchanger 72.

The cooler 62 can receive warmed water from the condenser 46 and/or the solvent condenser 68 of the distillation unit 40 and cool it through known means. It can be appreciated that the waste water from the centrifuge 34 may be transferred to the cooler 62. The cooled water from the cooler 62 can then be transferred back to the condenser 46 to cool and condense the solvent vapor from the dryer 66 to liquid form for pumping back to the centrifuge 34. The cooled water from the cooler 62 can further be transferred back to the solvent condenser 68 of the distillation unit 40 to cool and condense the upwardly flowing vapor UV to liquid form.

In the exemplary, to support the process of the present technology, a variety of samples were tested utilizing a blend of a polar and non-polar solvents. The samples in the test included: 1) produced sands from a separator located at Cold Lake, Alberta; 2) waste such as COC cuttings (Invert Drill Cuttings) provided from Tervita Corporation; 3) Slop Oil, considered as crude oil which is emulsified with water and solids, which can be found in evaporation ponds, sludge pits, storage tanks, and permitted commercial disposal facilities; and 4) Thermomechanical Cuttings Cleaner (TCC) Cuttings. The results of the tests are shown in Tables 1 and 2, utilizing the Alberta Tier 1 (ABT1) Guidelines for soil and subsoil remediation.

The data shown in Table 1 includes the maximum parts per million (ppm) contamination limits listed in ABT1 for Benzene, Toluene, Ethyl-Benzene, and Xylenes.

TABLE 1

| | ABT1 Guidelines for Soil and Subsoil (mg/kg) | Benzene (ppm) | Toluene (ppm) | Ethyl-Benzene (ppm) | Xylenes (ppm) | Moisture Content (%) |
|---|---|---|---|---|---|---|
| ID | Fine Grain (as per ABT1 Guidelines) | 0.046 | 0.520 | 0.073 | 0.990 | — |
| | Coarse Grain (as per ABT1 Guidelines) | 0.078 | 0.120 | 0.140 | 1.900 | — |
| RCS-01 | 1 | 0.032 | 0.259 | 24.480 | 52.285 | 0.402 |
| RCS-Blank | 2 | <DL | 0.034 | 21.916 | 46.823 | 6.567 |
| RCS-02 | 3 | <DL | 0.034 | 28.880 | 61.684 | 10.612 |
| Prelim | 4 | — | — | — | — | 7.166 |
| RCS-03 | 5 | 0.026 | 0.074 | 0.045 | 0.111 | 4.934 |
| RCS-04 | 6 | <DL | 0.042 | 0.040 | 0.145 | 5.406 |
| RCS-05 | 7 | <DL | <DL | 0.025 | 0.069 | 14.600 |
| RCS-06 | 8 | <DL | <DL | 0.035 | 0.127 | 12.808 |
| RCS-07 | 9 | <DL | <DL | 0.023 | 0.089 | 5.197 |
| RCS-08 | 10 | <DL | <DL | 0.036 | 0.128 | 12.307 |
| RCS-09 | 11 | <DL | <DL | 0.023 | 0.118 | 8.307 |
| RCS-10 | 12 | <DL | <DL | 0.050 | 0.116 | 11.638 |
| RCS-11 | 13 | <DL | <DL | 0.034 | 0.110 | 6.730 |
| RCS-12 | 14 | <DL | <DL | 0.032 | 0.123 | 5.784 |
| RCS-13 | 15 | 91.159 | <DL | 128.944 | 357.497 | 70.234 |
| RCS-14 | 16 | 11.881 | 123.626 | 25.757 | 415.647 | 74.271 |
| RCS-15 | 17 | 69.225 | 411.431 | 109.775 | 313.167 | 70.153 |
| RCS-16 | 18 | 1.742 | 38.979 | 14.033 | 240.280 | 80.207 |
| RCS-17 | 19 | 27.726 | 254.098 | 53.570 | 856.673 | 75.921 |
| RCS-18 | 20 | 88.845 | <DL | 146.315 | 351.860 | 71.232 |
| RCS-19 | 21 | 1.959 | 19.635 | 4.674 | 76.458 | 80.837 |
| RCS-20 | 22 | <DL | 1.646 | 0.040 | 0.091 | 10.149 |
| RCS-21 | 23 | 0.064 | <DL | 0.110 | 0.274 | 0.296 |
| RCS-22 | 24 | <DL | 0.291 | 0.024 | 0.045 | 9.560 |
| RCS-23 | 25 | <DL | 77.881 | 0.071 | 0.217 | 0.255 |
| RCS-24 | 26 | 0.020 | 2.366 | 0.039 | 0.107 | 1.370 |
| RCS-25 | 27 | 0.214 | <DL | 0.372 | 0.563 | 0.628 |
| RCS-26 | 28 | 0.032 | 1.076 | 0.037 | 0.116 | 7.571 |
| RCS-27 | 29 | <DL | <DL | 0.045 | 0.110 | 7.643 |
| RCS-28 | 30 | 0.017 | 2.017 | 0.054 | 0.205 | 0.494 |
| RCS-29 | 31 | 0.074 | 2.242 | 0.740 | 13.186 | 4.815 |
| RCS-30 | 32 | <DL | <DL | 0.025 | <DL | 6.381 |
| RCS-31 | 33 | 0.051 | 62.713 | 0.053 | 0.188 | 2.899 |
| RCS-32 | 34 | <DL | 0.151 | 0.033 | 0.098 | 6.123 |
| RCS-33 | 35 | <DL | 0.743 | 0.027 | 0.080 | 4.750 |
| RCS-34 | 36 | <DL | 0.148 | 0.022 | 0.064 | 4.531 |
| RCS-35 | 37 | <DL | 0.423 | 0.017 | <DL | 0.766 |
| RCS-36 | 38 | <DL | <DL | <DL | <DL | 6.595 |
| RCS-37 | 39 | <DL | <DL | <DL | 0.056 | 4.863 |
| RCS-38 | 40 | <DL | 0.340 | <DL | <DL | 1.239 |
| RCS-39 | 41 | 0.080 | <DL | 0.159 | 0.194 | 5.669 |
| RCS-40 | 42 | <DL | <DL | 0.038 | 0.102 | 7.194 |
| RCS-41 | 43 | <DL | 12.114 | 0.037 | 0.119 | 6.805 |
| RCS-42 | 44 | <DL | 11.201 | 0.029 | 0.080 | 6.065 |
| RCS-43 | 45 | <DL | 0.132 | 0.018 | 0.060 | 6.530 |
| RCS-44 | 46 | <DL | <DL | <DL | <DL | 1.859 |

TABLE 1-continued

| | ABT1 Guidelines for Soil and Subsoil (mg/kg) | Benzene (ppm) | Toluene (ppm) | Ethyl-Benzene (ppm) | Xylenes (ppm) | Moisture Content (%) |
|---|---|---|---|---|---|---|
| RCS-45 | 47 | <DL | 14.266 | 0.019 | <DL | 3.299 |
| RCS-46 | 48 | 0.070 | <DL | 0.056 | 0.107 | 0.421 |
| RCS-47 | 49 | 0.021 | <DL | 0.059 | 0.125 | 9.149 |
| RCS-48-10 | 50 | 0.020 | 7.248 | 0.055 | 0.136 | 6.266 |
| RCS-48-20 | 51 | <DL | 4.446 | 0.053 | 0.127 | 6.689 |
| RCS-49-10 | 52 | <DL | 0.737 | 0.045 | 0.097 | 1.834 |
| RCS-49-30 | 53 | <DL | 0.306 | 0.043 | 0.091 | 1.658 |
| RCS-50-10 | 54 | <DL | <DL | 0.041 | 0.083 | 1.076 |
| RCS-50-24 | 55 | <DL | <DL | 0.039 | 0.096 | 0.072 |
| RCS-51 | 56 | 0.019 | <DL | 0.055 | 0.119 | 9.037 |
| RCS-52-A | 57 | <DL | 2.722 | 0.046 | 0.107 | 2.653 |
| RCS-52-B | 58 | <DL | <DL | 0.040 | 0.090 | 0.328 |
| RCS-53-A | 59 | <DL | <DL | 0.039 | 0.081 | 3.302 |
| RCS-53-B | 60 | <DL | <DL | 0.034 | 0.076 | 0.985 |
| RCS-54 | 61 | 0.027 | <DL | 0.065 | 0.143 | 9.817 |
| RCS-55-A | 62 | <DL | <DL | 0.049 | 0.111 | 3.124 |
| RCS-55-B | 63 | <DL | <DL | 0.044 | 0.101 | 0.227 |
| RCS-56*$_1$ | 64*$_1$ | 96.980*$_1$ | 192.823*$_1$ | 49.590*$_1$ | <DL*$_1$ | 67.095*$_1$ |
| RCS-57*$_1$ | 65*$_1$ | 0.251*$_1$ | <DL*$_1$ | 0.301*$_1$ | 1.897*$_1$ | 39.774*$_1$ |
| RCS-58 | 66 | <DL | <DL | 0.047 | 0.107 | 9.307 |
| RCS-59-A | 67 | <DL | <DL | 0.041 | 0.098 | 0.400 |
| RCS-60 | 68 | 0.103 | 0.686 | 1.040 | 8.509 | 18.179 |
| RCS-61-A | 69 | 0.073 | 7.241 | 0.092 | 0.424 | 3.025 |
| RCS-61-B | 70 | 0.056 | 0.456 | 0.080 | 0.357 | 0.280 |
| RCS-62 | 71 | <DL | <DL | 12.099 | 34.636 | 9.279 |
| RCS-63-5 | 72 | <DL | 4.427 | 0.066 | 0.153 | 3.333 |
| RCS-63-10 | 73 | <DL | <DL | 0.033 | 0.085 | 0.708 |
| RCS-64-5 | 74 | <DL | 4.970 | 0.024 | 0.075 | 2.517 |
| RCS-64-10 | 75 | <DL | <DL | 0.020 | 0.056 | 0.371 |
| RCS-65-10 | 76 | 0.715 | 0.569 | <DL | <DL | 36.936 |
| RCS-65-24 | 77 | 0.078 | 5.567 | <DL | <DL | 11.648 |
| RCS-66 | 77 | <DL | 5.710 | 2.294 | 40.698 | 10.154 |
| RCS-67-5 | 78 | <DL | 4.030 | 0.053 | 0.737 | 4.117 |
| RCS-67-10 | 79 | <DL | 5.209 | <DL | <DL | 1.650 |
| RCS-68-5*$_3$ | 80*$_3$ | 10.076*$_3$ | 5.113*$_3$ | <DL*$_3$ | 0.083*$_3$ | 3.712*$_3$ |
| RCS-68-10*$_3$ | 81*$_3$ | <DL*$_3$ | <DL*$_3$ | <DL*$_3$ | <DL*$_3$ | 1.175*$_3$ |
| RCS-69-5*$_3$ | 82*$_3$ | <DL*$_3$ | <DL*$_3$ | 10.884*$_3$ | 30.959*$_3$ | 3.683*$_3$ |
| RCS-69-10*$_3$ | 83*$_3$ | <DL*$_3$ | <DL*$_3$ | <DL*$_3$ | <DL*$_3$ | 1.645*$_3$ |
| RCS-70-5*$_3$ | 84*$_3$ | <DL*$_3$ | 4.975*$_3$ | <DL*$_3$ | <DL*$_3$ | 2.218*$_3$ |
| RCS-70-10*$_3$ | 85*$_3$ | <DL*$_3$ | 4.969*$_3$ | <DL*$_3$ | <DL*$_3$ | 0.660*$_3$ |
| RCS-71-5 | 86 | <DL | 4.883 | <DL | <DL | 2.216 |
| RCS-71-10 | 87 | <DL | <DL | <DL | <DL | 0.618 |
| RCS-72-5 | 88 | <DL | <DL | <DL | <DL | 3.377 |
| RCS-72-10 | 89 | <DL | <DL | <DL | <DL | 1.351 |
| RCS-73-5 | 90 | <DL | <DL | <DL | <DL | 3.294 |
| RCS-73-10 | 91 | <DL | <DL | <DL | <DL | 1.504 |
| RCS-76*$_2$ | 92*$_2$ | | | | | |
| RCS-74-5 | 93 | 0.066 | <DL | 0.075 | 0.214 | 3.558 |
| RCS-74-10 | 94 | 0.056 | <DL | 0.061 | 0.184 | 1.702 |
| RCS-75-5*$_4$ | 95*$_4$ | 0.054*$_4$ | <DL*$_4$ | 0.060*$_4$ | 0.178*$_4$ | 3.204*$_4$ |
| RCS-75-10*$_4$ | 96*$_4$ | 0.053*$_4$ | <DL*$_4$ | 0.060*$_4$ | 0.174*$_4$ | 4.436*$_4$ |
| RCS-77 | 97 | 0.054 | <DL | 0.062 | 0.175 | 9.910 |
| RCS-78-5 | 98 | 0.057 | 3.397 | 0.062 | 0.214 | 5.638 |
| RCS-78-10 | 99 | 0.051 | 1.425 | 0.057 | 0.181 | 3.520 |
| RCS-79-5 | 100 | 0.048 | 4.201 | 0.055 | 0.155 | 3.189 |
| RCS-79-10 | 101 | 1.491 | <DL | 3.277 | 43.333 | 0.936 |
| RCS-80-5 | 102 | 0.048 | 4.149 | 0.055 | 0.178 | 3.328 |
| RCS-80-10 | 103 | 0.046 | 0.482 | 0.051 | 0.156 | 0.074 |
| RCS-81-5 | 104 | 0.046 | 0.670 | 0.050 | 0.151 | 1.985 |
| RCS-81-18 | 105 | 0.045 | <DL | 0.049 | 0.147 | 0.143 |
| RCS-82 | 106 | 0.051 | <DL | 0.059 | 0.167 | 12.896 |
| RCS-83-10 | 107 | 0.047 | 0.434 | 0.050 | 0.149 | 1.393 |
| RCS-84 | 108 | 21.131 | <DL | 125.314 | <DL | 70.997 |
| RCS-85-10*$_4$ | 109*$_4$ | 0.071*$_4$ | 1.908*$_4$ | 0.085*$_4$ | 0.477*$^4$ | 19.897*$_4$ |
| RCS-86 | 110 | 0.092 | <DL | 0.112 | 0.287 | 20.524 |
| RCS-87-10 | 111 | 0.065 | 0.686 | 0.080 | 0.242 | 4.139 |
| RCS-88-10 | 112 | 0.059 | 0.306 | 0.075 | 0.217 | 2.649 |
| RCS-89-10 | 113 | 0.055 | 2.935 | 0.068 | 0.179 | 1.647 |
| RCS-90-10 | 114 | 0.054 | 3.309 | 0.066 | 0.179 | 2.138 |
| RCS-91*4 | 115*$_4$ | 0.221*$_4$ | 10.034*$_4$ | 2.166*$_4$ | 13.616*$_4$ | 18.365*$_4$ |
| RCS-92-20*$_4$ | 116*$_4$ | 0.109*$_4$ | 1.005*$_4$ | 0.141*$_4$ | 0.588*$_4$ | 1.999*$_4$ |
| RCS-93-20*$_4$ | 117*$_4$ | 0.107*$_4$ | 9.012*$_4$ | 0.130*$_4$ | 0.602*$_4$ | 1.263*$_4$ |
| RCS-94*$_4$ | 118*$_4$ | 13.947*$_4$ | <DL*$_4$ | 92.858*$_4$ | <DL*$_4$ | 67.077*$_4$ |
| RCS-95-5*$_4$ | 119*$_4$ | 0.259*$_4$ | 12.477*$_4$ | 1.726*$_4$ | 30.964*$_4$ | 21.755*$_4$ |
| RCS-95-10*$_4$ | 120*$_4$ | 0.116*$_4$ | <DL*$_4$ | 0.721*$_4$ | 10.777*$_4$ | 20.786*$_4$ |

The data shown in Table 2 are from the exact same test samples shown in Table 1, and includes the maximum parts per million (ppm) contamination limits listed in ABT1 for F1, F2, F3, F4, and F4G hydrocarbons.

TABLE 2

| ID | ABT1 Guidelines for Soil and Subsoil (mg/kg) | F1 (ppm) | F2 (ppm) | F3 (ppm) | F4 (ppm) | F4G (ppm) |
|---|---|---|---|---|---|---|
| | Fine Grain (as per ABT1 Guidelines) | 210/320 | 150/260 | 1,300/2,500 | 5,600/6,600 | — |
| | Coarse Grain (as per ABT1 Guidelines) | 210/24/270 | 150/130/260 | 300/1,700 | 2,800/3,300 | — |
| RCS-01 | 1 | 25.263 | 38* | 220* | 118* | 1988.334* |
| RCS-Blank | 2 | 307.702 | 579* | 2440* | 1030* | 3784.013* |
| RCS-02 | 3 | 54.488 | — | — | — | 15078.089* |
| Prelim | 4 | — | 589* | 6340* | 1120* | — |
| RCS-03 | 5 | 295.545 | — | — | — | 7029.855* |
| RCS-04 | 6 | 357.655 | — | — | — | 9845.888* |
| RCS-05 | 7 | 50.241 | — | — | — | 16838.829* |
| RCS-06 | 8 | 26.190 | — | — | — | — |
| RCS-07 | 9 | 14.900 | 41* | 291* | 210* | — |
| RCS-08 | 10 | 42.646 | — | — | — | — |
| RCS-09 | 11 | 55.066 | 258* | 1550* | 1090* | — |
| RCS-10 | 12 | 52.575 | — | — | — | — |
| RCS-11 | 13 | 51.805 | 181* | 1120* | 626* | — |
| RCS-12 | 14 | 176.521 | 188* | 1030* | 551* | — |
| RCS-13 | 15 | 18458.016 | — | — | — | — |
| RCS-14 | 16 | 12424.152 | 8110* | 12300* | 2410* | — |
| RCS-15 | 17 | 19816.282 | — | — | — | — |
| RCS-16 | 18 | 21247.147 | — | — | — | — |
| RCS-17 | 19 | 12788.894 | — | — | — | — |
| RCS-18 | 20 | 18985.846 | 31300* | 37900* | 5510* | — |
| RCS-19 | 21 | 15385.460 | 1170* | 1830* | 438* | — |
| RCS-20 | 22 | 27.491 | 672.988 | 6081.036 | 2892.410 | 16794.305 |
| RCS-21 | 23 | 173.897 | 1.944 | 18.561 | 2.823 | 2250.802 |
| RCS-22 | 24 | 16.130 | 1170.455 | 8199.118 | 3492.203 | 14975.908 |
| RCS-23 | 25 | 59.121 | <DL | <DL | <DL | 1524.570 |
| RCS-24 | 26 | 9.351 | 987.819 | 9484.656 | 3932.306 | 23130.841 |
| RCS-25 | 27 | 1503.313 | 2.975 | 74.289 | 10.753 | 495.859 |
| RCS-26 | 28 | 226.477 | 15.246 | 213.029 | 11.064 | 3267.021 |
| RCS-27 | 29 | 48.011 | 533.549 | 5357.307 | 2233.134 | 26253.404 |
| RCS-28 | 30 | 6.712 | 5.073 | 40.965 | 0.135 | 5455.409 |
| RCS-29 | 31 | 131.866 | 15.515 | 935.967 | 1634.254 | 10547.030 |
| RCS-30 | 32 | 59.432 | 860.010 | 6295.631 | 2503.220 | 16923.747 |
| RCS-31 | 33 | 78.525 | 26.036 | 67.789 | 0.250 | 1409.022 |
| RCS-32 | 34 | 18.490 | 775.122 | 5759.956 | 2455.020 | 14668.661 |
| RCS-33 | 35 | 9.795 | 13.856 | 268.058 | 182.549 | 2644.623 |
| RCS-34 | 36 | 9.627 | 8.060 | 296.667 | 168.906 | 2501.646 |
| RCS-35 | 37 | 13.019 | 15.790 | 135.793 | 121.938 | 719.963 |
| RCS-36 | 38 | 46.474 | 974.079 | 7815.163 | 3243.902 | 22120.404 |
| RCS-37 | 39 | 154.047 | 0.098 | 431.435 | 214.444 | 2086.130 |
| RCS-38 | 40 | 13.781 | 6.101 | 78.462 | 58.472 | 2159.843 |
| RCS-39 | 41 | 502.367 | 28.361 | 218.531 | 112.066 | 1201.989 |
| RCS-40 | 42 | 47.301 | 20.475 | 611.166 | 2426.378 | 14189.784 |
| RCS-41 | 43 | 168.861 | 39.591 | 789.120 | 390.927 | 1683.301 |
| RCS-42 | 44 | 20.498 | 8.022 | 524.380 | 282.339 | 952.963 |
| RCS-43 | 45 | 9.980 | 4.834 | 170.275 | 159.391 | 2255.116 |
| RCS-44 | 46 | 40.003 | 757.793 | 4765.246 | 2051.825 | 10452.044 |
| RCS-45 | 47 | 19.707 | 22.280 | 126.722 | 110.656 | 1319.062 |
| RCS-46 | 48 | 207.207 | 23.532 | 20.488 | 64.823 | 1004.070 |
| RCS-47 | 49 | 35.795 | 791.765 | 4979.073 | 2160.676 | 15353.689 |
| RCS-48-10 | 50 | 32.262 | 144.102 | 1138.164 | 539.039 | 5653.020 |
| RCS-48-20 | 51 | 29.353 | 122.300 | 1230.897 | 590.046 | 5844.670 |
| RCS-49-10 | 52 | 14.944 | 20.614 | 907.312 | 1189.516 | 1448.950 |
| RCS-49-30 | 53 | 14.735 | 50.410 | 317.199 | 127.190 | 1730.823 |
| RCS-50-10 | 54 | 9.465 | <DL | <DL | <DL | 1518.388 |
| RCS-50-24 | 55 | 6.390 | <DL | <DL | <DL | 861.542 |
| RCS-51 | 56 | 80.788 | 22.650 | 5902.023 | 2131.374 | 14138.220 |
| RCS-52-A | 57 | 13.433 | 11.179 | 250.948 | 166.632 | 1368.181 |
| RCS-52-B | 58 | 8.362 | 11.225 | 179.385 | 107.624 | 1325.928 |
| RCS-53-A | 59 | 9.348 | 4.245 | 392.772 | 214.783 | 1343.694 |
| RCS-53-B | 60 | 6.172 | 9.747 | 252.335 | 150.253 | 1427.543 |
| RCS-54 | 61 | 52.790 | 23.324 | 10168.196 | 3873.153 | — |
| RCS-55-A | 62 | 10.712 | 6.041 | 251.001 | 175.090 | — |

TABLE 2-continued

| | ABT1 Guidelines for Soil and Subsoil (mg/kg) | F1 (ppm) | F2 (ppm) | F3 (ppm) | F4 (ppm) | F4G (ppm) |
|---|---|---|---|---|---|---|
| RCS-55-B | 63 | 4.277 | 1.608 | 110.286 | 2.179 | — |
| RCS-56*₁ | 64*₁ | 5015.352*₁ | 122749.495*₁ | 159437.61211 | 51872.861*₁ | — |
| RCS-57*₁ | 65*₁ | 337.206*₁ | 14.299*₁ | 560.586*₁ | 491.887*₁ | — |
| RCS-58 | 66 | 34.310 | 22.976 | 5833.963 | 2023.302 | — |
| RCS-59-A | 67 | 6.400 | 931 | 508* | 216* | — |
| RCS-60 | 68 | 536.947 | 36300* | 863001 | 784* | — |
| RCS-61-A | 69 | 22.497 | 1.637 | 2159.088 | 7.435 | — |
| RCS-61-B | 70 | 11.370 | 527* | 2520* | <DL* | — |
| RCS-62 | 71 | 46.193 | 14.568 | 5607.076 | 2259.673 | — |
| RCS-63-5 | 72 | 8.259 | 15.087 | 274.739 | 115.405 | — |
| RCS-63-10 | 73 | 7.317 | 0.861 | 416.198 | 207.785 | — |
| RCS-64-5 | 74 | 6.861 | 3.897 | 361.783 | 176.246 | — |
| RCS-64-10 | 75 | 5.997 | 2.402 | 318.268 | 1818.924 | — |
| RCS-65-10 | 76 | 947.075 | 1319.955 | 852.190 | 199.214 | — |
| RCS-65-24 | 77 | 17.763 | 1787.939 | 4038.813 | 777.027 | — |
| RCS-66 | 77 | 32.570 | 19.495 | 9660.492 | 3619.812 | — |
| RCS-67-5 | 78 | 10.457 | 4.244 | 527.222 | 258.500 | — |
| RCS-67-10 | 79 | 7.168 | 1.013 | 414.318 | 198.423 | — |
| RCS-68-5*₃ | 80*₃ | 55.454*₃ | 1.226*₃ | 344.234*₃ | 175.113*₃ | — |
| RCS-68-10*₃ | 81*₃ | 5.341*₃ | 5.242*₃ | 269.076*₃ | 187.077*₃ | — |
| RCS-69-5*₃ | 82*₃ | 7.909*₃ | 8.687*₃ | 234.748*₃ | 177.987*₃ | — |
| RCS-69-10*₃ | 83*₃ | 8.375*₃ | 6.073*₃ | 303.322*₃ | 215.994*₃ | — |
| RCS-70-5*₃ | 84*₃ | 9.016*₃ | 9.908*₃ | 273.429*₃ | 171.397*₃ | — |
| RCS-70-10*₃ | 85*₃ | 6.214*₃ | 1.286*₃ | 174.540*₃ | 137.028*₃ | — |
| RCS-71-5 | 86 | 7.234 | 4.729 | 283.005 | 199.947 | — |
| RCS-71-10 | 87 | 6.337 | 0.658 | 388.136 | 207.991 | — |
| RCS-72-5 | 88 | 10.815 | 2.324 | 655.562 | 324.858 | — |
| RCS-72-10 | 89 | 8.785 | 0.843 | 479.757 | 233.751 | — |
| RCS-73-5 | 90 | 9.983 | 4.153 | 566.340 | 277.069 | — |
| RCS-73-10 | 91 | 8.748 | 0.581 | 546.013 | 279.502 | — |
| RCS-76-2 | 92*₂ | | | | | — |
| RCS-74-5 | 93 | 7.627 | 1.287 | 209.275 | 93.108 | — |
| RCS-74-10 | 94 | 4.696 | 16.902 | 281.059 | 91.209 | — |
| RCS-75-5*₄ | 95*₄ | 6.320*₄ | 4.680*₄ | 1078.020*₄ | 109.016*₄ | — |
| RCS-75-10*₄ | 96*₄ | 7.144*₄ | 99.241*₄ | 623.591*₄ | 73.605*₄ | — |
| RCS-77 | 97 | 54.627 | 24.708 | 6945.873 | 2578.783 | — |
| RCS-78-5 | 98 | 14.050 | 3.170 | 103.911 | 63.010 | — |
| RCS-78-10 | 99 | 7.912 | 4.942 | 35.696 | 22.870 | — |
| RCS-79-5 | 100 | 12.572 | 11.974 | 62.901 | 35.869 | — |
| RCS-79-10 | 101 | 1205.673 | 7.416 | 29.137 | 17.537 | — |
| RCS-80-5 | 102 | 13.481 | 7.386 | 310.308 | 24.790 | — |
| RCS-80-10 | 103 | 7.416 | 25.563 | 292.907 | 153.333 | — |
| RCS-81-5 | 104 | 7.450 | 9.822 | 212.521 | 103.314 | — |
| RCS-81-18 | 105 | 5.102 | 13.001 | 228.487 | 90.219 | — |
| RCS-82 | 106 | 24.705 | 23.012 | 7080.794 | 2612.591 | — |
| RCS-83-10 | 107 | 7.104 | 8.692 | 158.898 | 110.135 | — |
| RCS-84 | 108 | 15839.110 | 35455.589 | 57112.076 | 5014.950 | — |
| RCS-85-10*₄ | 109*₄ | 15.676*₄ | 8019.103*₄ | 19221.084*₄ | 2837.704*₄ | — |
| RCS-86 | 110 | 85.665 | 34.681 | 11756.401 | 4105.392 | — |
| RCS-87-10 | 111 | 16.174 | 5.418 | 2471.550 | 970.560 | — |
| RCS-88-10 | 112 | 10.504 | 14.610 | 620.769 | 254.049 | — |
| RCS-89-10 | 113 | 14.749 | 18.467 | 1012.486 | 350.710 | — |
| RCS-90-10 | 114 | 14.988 | 7.280 | 631.886 | 305.035 | — |
| RCS-91*⁴ | 115*₄ | 1393.971*₄ | 31933.154*₄ | 94615.126*₄ | 470.147*₄ | — |
| RCS-92-20*⁴ | 116*₄ | 16.246*₄ | 9.418*₄ | 670.273*₄ | 95.362*₄ | — |
| RCS-93-20*₄ | 117*₄ | 25.394*₄ | 1.367*₄ | 482.507*₄ | 11.757*₄ | — |
| RCS-94 | 118*₄ | 12106.360*₄ | 42111.597*₄ | 61157.945*₄ | 5947.544*₄ | — |
| RCS-95-5*₄ | 119*₄ | 540.232*₄ | 1597.900*₄ | 3255.080*₄ | 392.945*₄ | — |
| RCS-95-10*₄ | 120*₄ | 570.238*₄ | 521.820*₄ | 1188.638*₄ | 276.445*₄ | — |

Legend and Non-Conformances for Tables 1 and 2

| * | External Analysis |
|---|---|
| — | Not Analyzed |
| *₁ | Samples originated from sludge-based feed and have been found to absorb a large extent of the extraction and preservation solvents was not possible to be liberated. Accuracy of the results for BTEX F1-F4 cannot be guaranteed. |
| * | External Analysis |
| *₂ | Extraction aborted due to sample matrix. Sample matrix was a sludge, which absorbed the extraction solvent. Additionally, the solvent partially dissolved the sample matrix. |
| *₃ | Samples taken on May 28 at approximately 3pm. Samples were not preserved for BTEX and F1 until May 29 at 9:30am. |

| | |
|---|---|
| * | External Analysis |
| | Results for BTEX F1 may not be representative of the analyte concentrations at the time of collection. |
| *₄ | Sample matrix was largely micro fines/clay. These micro fines passed through all filtration steps in the house SOP. A filtration step using glass filters was implemented prior to dilution to remove the micro fines. Any result deviation from expectations could be a result of the modified procedure. |

The format used in Tables 1 and 2 associated with sample column "ID" is RCS-#-5/10, where RCS-# is the trial #, and the 5/10 is the amount of time spent air sparging. For example, sample run RCS-95-10 can indicate a trail number of "95" with 10 minute air sparging. It is pointed out that test runs 1 (RCS-01) to 60 (RCS-53-B) in Tables 1 and 2 include iso-propanol, toluene, hexane etc. and are provided as background information.

The present technology can include additional components such as, but not limited to, filters, screeners, solar panels, wind generators, combustion engines or turbines, turbine generators, power distribution and control systems, operator consoles, enclosure structures, cranes or any equipment required for supporting operations of the system 10. Further, the components of the system 10 can be configured as modules including attachment means configured to attaching the module to the mobile unit 12. These modules can be configured to be rearranged on the mobile unit 12, and/or for easy replacement if the module is damaged.

The present technology can be designed as a high rate hydrocarbon solvent extraction process. The process can provide high removal rates of hydrocarbons from soils or water, specifically BTEX as well as F1, F2, F3, F4 hydrocarbons. The process is very low in energy consumption due to the azeotrope formed with polar and non-polar solvents. For example, the use of acetone and pentane solvent blend results in a solvent that boils at 27° C. at 1 atm pressure, and even lower under vacuum distillation. Thus it can be appreciated that the distillation unit 40 can be operated at atmospheric pressure or negative pressure to increase the removal effectiveness of the solvent blend by lowering its boiling temperature, for example below 30° C. This results in a substantial low energy input since very low amounts of energy or even not at all may be required for efficient operation of the distillation unit 40. This further reduces the size the equipment required for operation making it feasible for providing on the mobile unit or units 12.

The system, process and/or method of the present technology can include at least one computer configured or configurable for automated and/or controlling operations of any of the components in the system 10. The computer system can include one or more processors, memory, input and output device, display, and communication systems for transmitted and receiving data, along with sensors to monitor flow rate, volume level, particle size, temperature, pressure, vibration, energy or power consumption, energy or power generation, environmental conditions, material composition, and the like.

A database can be included which stores information on all solvents utilizable in the system, regulatory information for geographic locations, and/or information related to soil types. The database can be accessible by software for information retrieval, such that an operator of the system can enter in a site location, a soil type, a polar solvent, a non-polar solvent, regulatory requirements, and/or final product requirements. The software could then retrieve all required information from the database, process the information, and provide system control data to the operator. The software can be configured or configurable to provide automated control of any of the components of the system 10 based on the entered data, the retrieved date, sensor data, and/or updated data.

Some of the benefits of the system, process and/or method of the present technology are:

Nearly all solvent is recovered and reused.

Number of wash stages is unlimited and can be tailored to a specific waste stream.

Solvent blends are also optimized for soil types and ratios of clays/sands/organics.

The system and process are mobile and brought to customers site reducing greenhouse gas emissions over centralized sites.

Recovered soils can be used as fill materials in waste generators projects.

Dryer/solvent recovery at the end is run at a much lower temperature than known thermal methods and is focused around solvent recovery not high rate air sparging, as compared with known thermal methods. The present process uses a small amount of heat to accelerate the sparging process not burn off components.

Water treatment is an additional benefit of the present process, which allows for the providing of a full-spectrum waste management system, treating soils, water and recover hydrocarbons for sale.

It is noticed that the high rate extractor process of the present technology may be performed as solvent extraction used in soils testing in 8-12 hours over the conventional methods including a 24 hour soak time.

While embodiments of the hydrocarbon extraction soil remediation system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although extracting hydrocarbons from soil at high removal rates utilizing polar and non-polar solvents have been described, it should be appreciated that the hydrocarbon extraction soil remediation system and method herein described is also suitable for removing hydrocarbons from material using solvent extraction at low temperatures.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A hydrocarbon solvent extraction and recovery system comprising:

a mixing vessels a mixing vessel configured to mix contaminated material and a solvent mixture to form a slurry, said solvent mixture including a polar solvent and a non-polar solvent;

a bicanting unit in communication with said mixing vessel, respectively, and configured to separate a solvent stream and a material stream from said slurry, said solvent stream including said solvent mixture and one or more contaminants extracted from said contaminated material by said solvent mixture;

an air sparging unit configured to receive said material stream from said bicanting unit and to remove residual solvent vapor from said material stream to provide remediated material;

a centrifuge in communication with said bicanting unit, and configured to receive said solvent stream and remove water or micro-fines from said solvent stream;

a distillation unit configured to receive said solvent stream from said centrifuge and to recover said solvent mixture and a hydrocarbon product from said solvent stream;

a solvent recirculation means configured to recirculate at least a portion of said solvent mixture from said distillation unit to said mixing vessel; and a solvent condenser in communication with said air sparging unit and said centrifuge, said solvent condenser configured to receive and condense said residual solvent vapor, and wherein said centrifuge receiving said condensed residual solvent vapor.

2. The system according to claim 1, wherein said mixing vessel include a slurry recirculation line configured to recirculate said slurry prior to entering said bicanting unit, respectively, back to said mixing vessel.

3. The system according to claim 1 further comprising a boiler configured to receive a first return water from said distillation unit and to produce steam from said first return water, said steam being provided to said distillation unit.

4. The system according to claim 3 further comprising a water cooling unit configured to receive and cool a second return water from said distillation unit and a third return water from said solvent condenser to produce cooled water, and to provide said cooled water to said distillation unit and to said solvent condenser.

5. The system according to claim 4 further comprising an air heat exchanger configured to receive at least a portion of said steam from said boiler and to provide a fourth return water from said portion of said steam to said boiler, and wherein said air heat exchanger is configured to heat air to create heated air and provide said heated air to said air sparging unit.

6. The system according to claim 1, wherein said polar solvent is selected from the group consisting of acetone, methyl ethyl ketones and isopropyl alcohol, and said non-polar solvent is selected from the group consisting of pentane, butane, propane, ethane and methane, and wherein said contaminants are selected from the group consisting of one or more of benzene, toluene, ethyl-benzene, xylene, and F1-F4 hydrocarbon fractions.

7. The system according to claim 1 further comprising a $CO_2$ washing unit configured to receive said remediated material from said air sparging unit and to extract a residual contaminate from said remediated material.

8. The system according to claim 1 further comprising one or more mobile units configured to support said system.

9. A process for hydrocarbon solvent extraction and recovery, said process comprising the steps of:
a) mixing contaminated material with a solvent mixture in one or more mixing vessels am, said solvent mixture including a polar solvent and a non-polar solvent;
b) extracting one or more contaminants from said contaminated material by said solvent mixture;
c) separating of said solvent mixture to form a solvent stream and a material stream;
d) air sparging said material stream in a dryer to remove residual solvent vapor from said material stream to produce remediated material;
e) removing water or micro-fines from said solvent stream;
f) removing by distillation said contaminants from said solvent stream utilizing a distillation unit;
g) recovering separately said solvent mixture and a hydrocarbon product from said distillation unit; and
i) recirculating said recovered solvent mixture to said one or more mixing vessels;
wherein said contaminants include one or more contaminants selected from the group consisting of benzene, toluene, ethyl-benzene, xylene, and F1-F4 hydrocarbon fractions;
wherein said residual solvent vapor removed from said material stream in step d) is condensed by a solvent condenser, and said condensed solvent vapor is provided with said solvent stream to step e).

10. The process according to claim 9, wherein said polar solvent comprises one or more compounds selected from the group consisting of acetone, methyl ethyl ketones and isopropyl alcohol, and said non-polar solvent comprises one or more compounds selected from the group consisting of pentane, butane, propane, ethane and methane.

11. The process according to claim 10, wherein said polar solvent is acetone, and said non-polar solvent is pentane.

12. The process according to claim 9, wherein in step f) the distillation is conducted at a pressure of no greater than 1 atmosphere.

13. The process according to claim 9, wherein in step f) the distillation is conducted at a negative pressure.

14. The process according to claim 9, wherein said solvent mixture is has a boiling temperature of no more than 30° C. at 1 atmospheric pressure.

15. The process according to claim 9, wherein said solvent mixture recovered in step g) is recycled to said one or more mixing vessels in step a).

16. The process according to claim 15, wherein said material stream separated in step c) is recycled to said one or more mixing vessels in step a).

17. The process according to claim 16, wherein said solvent mixture and said material stream recycled to said one or more mixing vessels are combined prior to entering said mixing vessels.

18. The process according to claim 9, wherein said contaminated material is contaminated soil or water, and said remediated material is remediated soil or water.

* * * * *